United States Patent Office 3,847,910
Patented Nov. 12, 1974

---

3,847,910
FUSED-s-TRIAZINE-DIONES
Robert Bruce Moffett, Kalamazoo, Mich., assignor to The Upjohn Company, Kalamazoo, Mich.
No Drawing. Filed Mar. 12, 1973, Ser. No. 339,613
Int. Cl. C07d 57/34
U.S. Cl. 260—248 NS      6 Claims

ABSTRACT OF THE DISCLOSURE

This invention relates to novel compounds of the formulae

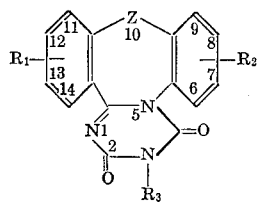

wherein $R_1$ and $R_2$ are selected from the group consisting of hydrogen, bromine, chlorine, fluorine, lower alkyl of 1 through 3 carbon atoms, lower alkoxy of 1 through 3 carbon atoms, lower alkylthio of 1 through 3 carbon atoms, lower alkylsulfonyl of 1 through 3 carbon atoms, lower dialkylamino having lower alkyl moieties of 1 through 3 carbon atoms, lower alkanoylamido having lower alkanoyl moieties of 1 through 3 carbon atoms, trifluoromethyl, cyano and nitro; $R_3$ is selected from the group consisting of hydrogen, lower alkyl of 1 through 3 carbon atoms, lower alkenyl of 3 through 4 carbon atoms, $-C_nH_{2n}-O-$ lower alkyl wherein $n$ is 2 through 6 and lower alkyl is of 1 through 3 carbon atoms, carboalkoxy having a lower alkyl moiety of 1 through 3 carbon atoms and

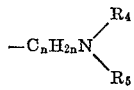

wherein $n$ has the same meaning as above and $R_4$ and $R_5$ have the same meaning as $R_3$, above, except carboalkoxy, and $R_4$ and $R_5$ when taken together with $-N<$ is a saturated heterocyclic amino radical selected from the group consisting of pyrrolidino, piperidino, hexamethylenimino, morpholino, thiomorpholino, piperazino, 4-lower alkyl piperazino wherein lower alkyl is of 1 through 3 carbon atoms, and their counterparts having lower alkyl substituent(s) of 1 through 3 carbon atoms; Z is selected from the group consisting of O, S,

and
$>N-R_9$ wherein $R_7$, $R_8$ and $R_9$ have the same meaning as $R_3$, above, except carboalkoxy, and $R_7$ in addition includes

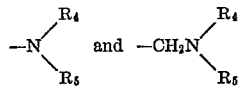

wherein $R_4$ and $R_5$ have the same meaning as above; and

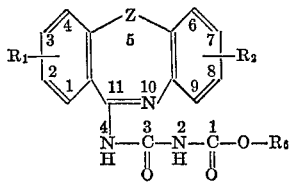

wherein $R_1$, $R_2$ and Z have the same meaning as above and $R_6$ is lower alkyl of 1 through 3 carbon atoms numbered as immediately above when Z is selected from the group consisting of O, S and N—$R_9$ and numbered as immediately below when Z is

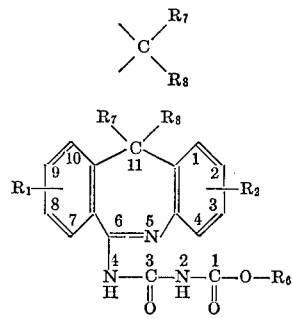

and pharmacologically acceptable acid addition salts of compounds of Formulae I and II. The systemic administration to humans and animals of the new products of Formulae I and II depresses their central nervous systems. The invention also relates to a process for the preparation of the aforesaid novel compounds (I and II).

CROSS REFERENCE TO RELATED APPLICATIONS

None.

BRIEF SUMMARY OF THE INVENTION

This invention relates to new organic compounds and is particularly concerned with novel compounds embraced by the formulae

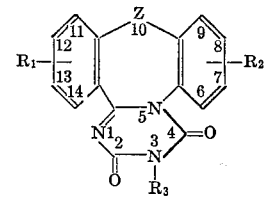

wherein $R_1$ and $R_2$ are selected from the group consisting of hydrogen, bromine, chlorine, fluorine, lower alkyl of 1 through 3 carbon atoms, lower alkoxy of 1 through 3 carbon atoms, lower alkylthio of 1 through 3 carbon atoms, lower alkylsulfonyl of 1 through 3 carbon atoms, lower dialkylamino having lower alkyl moieties of 1 through 3 carbon atoms, lower alkanolylamido having lower alkanoyl moieties of 1 through 3 carbon atoms, trifluoromethyl, cyano and nitro; $R_3$ is selected from the group consisting of hydrogen, lower alkyl of 1 through 3 carbon atoms, lower alkenyl of 3 through 4 carbon atoms, $-C_nH_{2n}-O-$ lower alkyl wherein $n$ is 2 through 6 and lower alkyl is of 1 through 3 carbon atoms, carboalkoxy having a lower alkyl moiety of 1 through 3 carbon atoms and

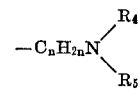

wherein $n$ has the same meaning as above and $R_4$ and $R_5$ have the same meaning as $R_3$, above, except carboalkoxy, and $R_4$ and $R_5$ when taken together with $-N<$ is a saturated heterocyclic amino radical selected from the group consisting of pyrrolidino, piperidino, hexamethylenimino, morpholino, thiomorpholino, piperazino, 4-lower alkylpiperazino wherein lower alkyl is of 1 through 3 carbon atoms, and their counterparts having lower alkyl substituent(s) of 1 through 3 carbon atoms; Z is selected from the group consisting of O, S,

and —N—R$_9$ wherein R$_7$, R$_8$ and R$_9$ have the same meaning as R$_3$, above, except carboalkoxy, and R$_7$ in addition includes

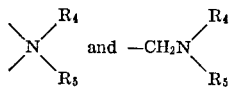

wherein R$_4$ and R$_5$ have the same meaning as above; and

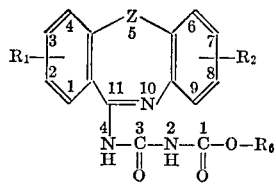

wherein R$_1$, R$_2$ and Z have the same meaning as above and R$_6$ is lower alkyl of 1 through 3 carbon atoms, numbered as immediately above when Z is selected from the group consisting of O, S and >N—R$_9$ and numbered as immediately below when Z is

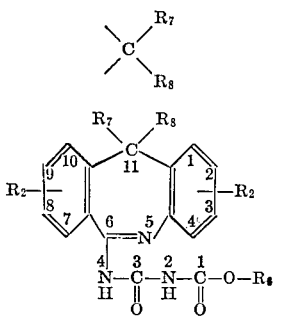

and pharmacologically acceptable acid addition salts of compounds of Formulae I and II.

Examples of lower alkyl of 1 through 3 carbon atoms are methyl, ethyl, propyl, and isopropyl. Examples of lower alkoxy of 1 through 3 carbon atoms are methoxy, ethoxy, propoxy and isopropoxy. Examples of lower alkylthio of 1 through 3 carbon atoms are methylthio, ethylthio, propylthio and isopropylthio. Examples of lower alkylsulfonyl of 1 through 3 carbon atoms are methylsufonyl, ethylsulfonyl, propylsulfonyl, and isopropylsulfonyl. Examples of lower dialkylamino having lower akyl moieties of 1 through 3 carbon atoms are dimethylamino, methylethylamino, methylpropylamino, diethylamino, ethylpropylamino, dipropylamino and diisopropylamino. Examples of lower alkanoylamido having lower alkanoyl moieties of 1 through 3 carbon atoms are formylamido, acetylamido, and propionylamido. Examples of lower alkenyl of 3 through 4 carbon atoms are allyl, methallyl, and crotyl. Examples of —C$_n$H$_{2n}$—O— lower alkyl wherein n is 2 through 6 and lower alkyl is of 1 through 3 carbon atoms are 2-methoxyethyl, 2-ethoxyethyl, 3-propoxypropyl, 3-ethoxy-2-butyl, 1-methoxypentyl, 2-methoxy-4-pentyl, 1-ethoxy-3-hexyl, and 3-propoxy-5-hexyl. Examples of carboalkoxy having a lower alkyl moiety of 1 through 3 carbon atoms are carbomethoxy, carboethoxy, carbopropoxy and carboisopropoxy. Examples of

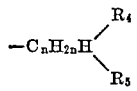

wherein n is 2 through 6 and R$_4$ and R$_5$ are selected from the group consisting of hydrogen, lower alkyl of 1 through 3 carbon atoms, and lower alkenyl of 3 through 4 carbon atoms are 2-aminoethyl,
2-(diethylamino)ethyl,
3-(dimethylamino)propyl,
3-(methylpropylamino)propyl,
3-(ethylmethylamino)butyl,
4-(dimethylamino)butyl,
4-(ethylpropylamino) pentyl,
5-(ethylmethylamino)pentyl,
4-(ethylpropylamino)hexyl,
6-(ethylmethylamino)hexyl,
1-(methylallylamino)ethyl,
2-(crotylethylamino)propyl,
3-(diallylamino)propyl, and
4-(methallylmethylamino)butyl.

Examples of

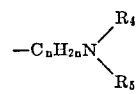

wherein n is 2 through 6 and R$_4$ and R$_5$ taken together with —N< is a saturated heterocyclic amino radical selected from the group consisting of pyrrolidino, piperidino, hexamethylenimino, morpholino, thiomorpholino, piperazino, 4-lower alkyl piperazino wherein lower alkyl is of 1 through 3 carbon atoms and their counterparts having lower alkyl substituent(s) are:

pyrrolidinoethyl,
2-(2,4-diethylpyrrolidino)-ethyl,
4-pyrrolidinobutyl,
piperidinoethyl,
5-(3-propylpiperidino)-pentyl,
3-(2-methyl-3-ethylpiperidino)-propyl,
hexamethyleniminoethyl,
2-(4-methylhexamethylenimino)-ethyl,
morpholinoethyl,
2-(3-methylmorpholino)-ethyl,
thiomorpholinoethyl,
2-(3-ethylthiomorpholino)-ethyl,
4-(2-ethyl-3-propylthiomorpholino)-butyl,
piperazinoethyl,
2-(2-ethylpiperazino)-ethyl,
4-(2,3-dipropylpiperazino)-butyl,
3-(2-methyl-4-ethylpiperazino)-propyl, and
4-(2,4-diethylpiperazino)-hexyl.

The novel compounds of Formulae I and II exist either in the non-protonated (free base) form or in the protonated (acid addition salt) form, depending on the pH of the environment. They form stable protonates, i.e., pharmocologically acceptable acid addition salts, on acidification of the free base with suitable pharmacologically acceptable acids, for example, hydrochloric, hydrobromic, sulfuric, phosphoric, nitric, acetic, propionic, palmitic, benzoic, salicylic, hexynoic, phenylbutyric, naphtholic, glycolic, succinic, nicotinic, tartaric, naleic, pamoic, methanesulfonic, naphthalenesulfonic, cyclohexanesulfonic, citric, and lactic acids, and the like. Conversely, the free bases of the novel compounds of Formulae I and II can be obtained from a salt (e.g., from the hydrochloride or sulfate salt) by neutralizating with a base such as sodium hydroxide, extracting with an immiscible solvent, for example, with chloroform, drying the extract, for example, with anhydrous sodium sulfate, and removing the solvent by evaporation.

The novel compounds (I and II) of this invention and a process for their preparation are represented by the following sequence of formulae:

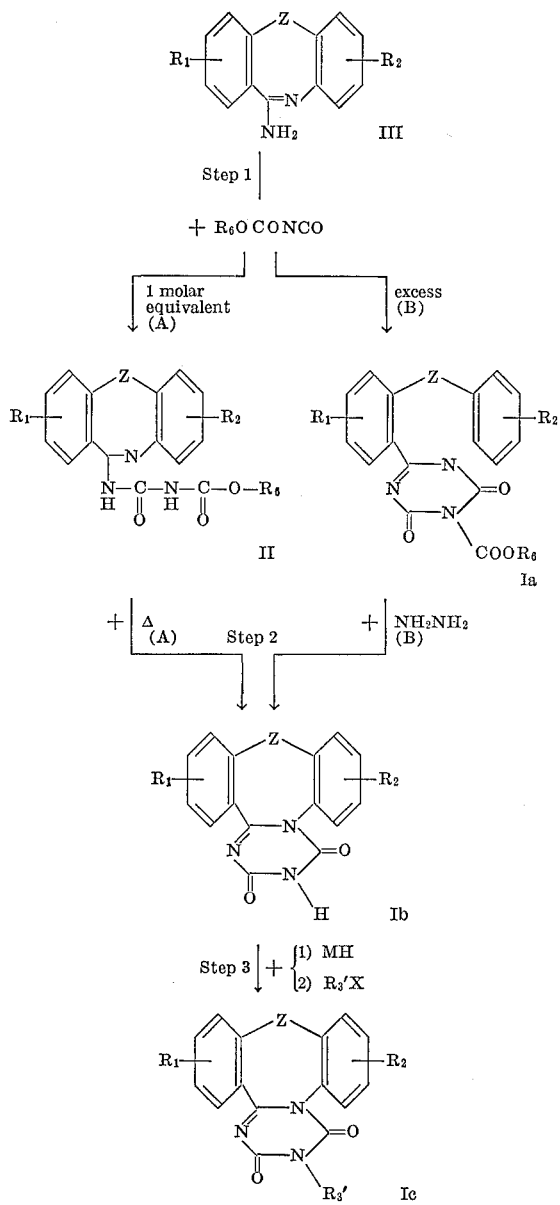

wherein $R_1$, $R_2$, $R_6$ and Z have the same meaning as above, $R_3'$ has the same meaning as $R_3$ above except hydrogen and carboalkoxy, M is an alkali metal selected from the group consisting of lithium, sodium and potassium and X is selected from the group consisting of bromine, chlorine, fluorine, an alkyl sulfonate of 1 through 3 carbon atoms and an aryl sulfonate of 6 through 12 carbon atoms.

The compounds embraced by Formulae I (Ia, Ib, and Ic) and II of the flowsheet, above are prepared by the procedures indicated therein, employing the methods and reactions described below.

(1) The first step [(A) III→II or (B) III→Ia] of the process of the aforesaid flow-sheet comprises mixing in the cold a starting compound of Formula III (i.e., a 6-aminomorphanthridine, an 11 - amino - 5H - dibenzo-[b,e][1,4]diazepine, an 11 - aminodibenzo[b,f][1,4]thiazepine or an 11 - aminodibenz[b,f][1,4]oxazepine) in an inert solvent (e.g., tetrahydrofuran) with a lower alkoxycarbonyl isocyanate. When the molar ratio of III to isocyanate is approximately 1:1 [(A) of flow-sheet], a corresponding compound of Formula II is produced, namely a 4 - (6 - morphanthrodinyl) - allophanic acid, alkyl ester, a 4 - (5H - dibenzo[b,e][1,4] - diazepin - 11-yl)allophanic acid, alkyl ester, a 4 - (dibenzo[b,f][1,4]-thiazepin - 11 - yl)allophanic acid, alkyl ester or a 4 - (dibenz[b,f][1,4]oxazepin - 11 - yl)allophanic acid, alkyl ester. The reaction is satisfactorily carried out at about 0° C., preferably with stirring under nitrogen, for from about 3 to about 8 hours. When the molar ratio of III to isocyanate is approximately 1 of the former to 2 (or more) of the latter reactants [(B) of flow-sheet], a corresponding compound of Formula Ia (Formula 1 wherein $R_3$ is $COOR_6$) is produced, i.e., a 2,10 - dihydro - 2,4-dioxodibenzo[c,f] - s - triazino[1,2 - ]azepine - 3(4H)-carboxylic acid, alkyl ester, a 2,10 - dihydro - 2,4 - dioxo-dibenzo[b,f] - s - triazino[1,2 - d][1,4]diazepine - 3(4H)-carboxylic acid, alkyl ester, a 2,10 - dihydro - 2,4 - dioxo-dibenzo[b,f] - s - triazino[1,2 - d][1,4] - thiazepine - 3-(4H) - carboxylic acid alkyl ester or a 2,10 - dihydro-2,4,10 - trioxodibenzo[b,f] - s - triazino[1,2 - d][1,4]oxazepine - 3(4H) - carboxylic acid, alkyl ester. The reactants are gradually mixed at low temperatures (preferably under nitrogen at well below 0° C.), allowed to come to room temperature, stirred for several hours and the solid product (1a) separated. Appropriate solvents for the reaction are benzene, dioxane and tetrahydrofuran.

(2) The second step [(A) II→Ib or (B) Ia→Ib] involves the formation of a compound of Formula Ib (Formula I wherein $R_3$ is hydrogen), namely, a dibenzo[c,f]-s-triazino[1,2-a]azepine-2,4(3H,10H)-dione, a dibenzo[b,f]-s-triazino]1,2-d][1,4]diazepine-2,4(3H,10H)-dione, a 2H-dibenzo[b,f]-s-triazino[1,2-d][1,4]thiazepine-2,4(3H,10H)-dione or a 2H-dibenzo[b,f]-s-triazino[1,2-d][1,4]oxazepine-2,4(3H)-dione.

As indicated in (A) of the flow-sheet, this is accomplished by ring cyclization of a corresponding compound (II) produced in step (1), e.g., by heating it (preferably under nitrogen at reflux temperature in an inert solvent such as xylene, diethylene glycol dimethyl ether, mesitylene and the like) for from about 1 to about 6 hours. Alternatively, as indicated in (B) of the flow-sheet, a compound of Formula Ia resulting from step (1) is converted to its corresponding compound (Ib), by reduction, for example, by heating it (preferably under nitrogen at reflux temperature in an inert solvent such as an alkanol) with hydrazine for from about 2 to about 6 hours.

(3) The final step (Ib→Ic) of the process comprises the conversion of a compound of Formula Ib produced in step (2) into a corresponding compound of Formula Ic (Formula I wherein $R_3$ is other than hydrogen or carboalkoxy) i.e., a 3 - substituted dibenzo[c,f] - s - triazino-[1,2 - a]azepine - 2,4 - (3H,10H) - dione, a 3 - substituted dibenzo[b,f] - s - triazino[1,2 - d][1,4]diazepine - 2,4-(3H,10H) - dione, a 3 - substituted 2H - dibenzo[b,f]-s - triazino[1,2-d][1,4]thiazepine - 2,4(3H,10H) - dione or a 3 - substituted 2H - dibenzo[b,f] - s - triazino[1,2-d] - [1,4]oxazepine - 2,4(3H) - dione. This is carried out by first heating (preferably under nitrogen, with stirring)

a dibenzo[c,f]-s-triazino[1,2-a]azepine-2,4(3H,10H)-dione, a dibenzo[b,f]-s-triazino[1,2-d][1,4]diazepine-2,4(3H,10H)-dione, a 2H-dibenzo[b,f]-s-triazino[1,2-d][1,4]thiazepine-2,4(3H,10H)-dione, or a 2H-dibenzo[b,f]-s-triazino[1,2-d]-[1,4]oxazepine-2,4(3H)-dione in a solvent such as dimethylformamide, diethylacetamide, dioxane or tetrahydrofuran with an alkali metal hydride (e.g., lithium hydride, sodium hydride or potassium hydride) or a thallous alkoxide (such as thallous ethoxide) at moderate temperatures (from about 50° C. to about 125° C.) for from about 20 minutes to about several hours; then, to this mixture, a compound of the formula $R_3'X$ ($R_3'$ and X having the meanings given above) in an inert solvent (such as benzene, tetrahydrofuran, dimethylformamide and the like) is added and heating (at from about 50° C. to about 125° C.) continued for from about 1 to about 24 hours. The product (Ic), thus obtained, is isolated and purified by conventional means, e.g., extraction, chromatography, crystallization and the like.

The starting materials of Formula III of this invention are known in the art. The preparation of representative compounds (III) wherein $R_1$ and $R_2$ are hydrogen and Z has a variety of meanings, e.g., (1) $CH_2$, (2) $CHN(C_2H_5)_2$, (3) $NCH_3$, (4) $NCH_2CH_2N(CH_3)_2$ and $N(CH_2)_3N(CH_3)_2$, (5) S and (6) O, are described in (1) J. Heterocyclic Chem. *3*, 206 (2) S. African Patent 67 07187, (3) Helv. Chim. Acta *50*, 1588, (4) French Patent 1,334,944, (5) Helv. Chim. Acta *50*, 245 and (6) French Patent 1,508,-536, respectively. Publications describing the preparation of starting materials (III) wherein $R_1$ and $R_2$ have meanings other than hydrogen and Z has meanings in addition to those of the immediately preceding sentence, are set forth in Preparation 1, below, and can also be prepared by similar methods familiar to those skilled in the art to which this invention pertains.

All of the compounds included within Formulae I (Ia, Ib, and Ic) and II of the flow-sheet, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, ethyl acetate, ether, methanol, methylene chloride and Skellysolve B (hexanes), mixtures and combinations of these solvents; also by gradient elution chromatography from an adsorbent column with a suitable mixture of solvents, such as methylene chloride-Skellysolve B, acetone-Skellysolve B, and the like.

The free bases and pharmacologically acceptable acid addition salts of the compounds of Formulae I (a, b, and c) and II are useful as central nervous system (CNS) depressants when administered to humans and animals. They possess tranquilizing activity and are consequently useful in humans for controlling anxiety and schizophrenia; in animals the aforesaid compounds are useful for their calming effects and can be given to reduce anxiety and aggressive behavior. These compounds have been shown to possess CNS depressing activity via the loss of righting reflex, traction, chimney, dish and pedestal tests carried out in the manner described by Bossier et al., in Medicina Experimentalis *4*, 145 (1961).

Tranquilizing effects of the compounds of this invention are shown by the following tests in mice:

*Chimney test:* [Med. Exp. *4*, 145 (1961)]: The tests determines the ability of mice to back up and out of a vertical glass cylinder within 30 seconds. At the effective dosage, 50% of the mice failed doing it.

*Dish test:* Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish.

*Pedestal test:* The untreated mouse leaves a standard pedestal in less than a minute to climb back to the floor of the standard mouse box. Transquilized mice will stay on the pedestal for more than 1 minute.

*Nicotine antagonism test:* Mice in a group of 6 are injected with the test compound. Thirty minutes later the mice including control (untreated mice are injected with nicotine salicylate (2 mg./kg.). The control mice show overstimulation, i.e., (1) running convulsions followed by (2) tonic extensor fits; followed by (3) death.

The following compounds typical of this invention have (by intraperitoneal injection) $ED_{50}$ as shown in the table below.

| Compound | $ED^{50}$ (in mg./kg.) | | | | |
|---|---|---|---|---|---|
| | CH | D | P | Ni(2) | Ni(3) |
| 3-[2-(dimethylamino)-ethyl]-dibenzo [c,f]-s-triazino[1,2-a]azepine-2,4(3H, 10H)-dione (I) | 29 | 1.6 | 2.8 | 45 | 50 |
| 4-(6-morphanthridinyl)-allophanic acid, ethyl ester (II) | 18 | 0.9 | 2.5 | 8 | 8 |

Note.—Ch=Chimney test; D=Dish test; P=Pedestal test; Ni= Nicotine antagonism (2) and (3) tests.

As tranquilizers, the compounds of Formulae I and II and their pharmacologically acceptable acid addition salts can be prepared and administered to humans, mammals, birds and animals in a wide variety of oral or parenteral dosage forms, singly or in admixture with other coacting compounds, in doses of from about 0.1 mg. to about 5 mg./kg., depending on the severity of the condition being treated and the recipients response to the medication. They can be administered with a pharmaceutical carrier which can be a solid material or a liquid in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs.

DETAILED DESCRIPTION

The following preparations and examples are illustrative of the manner of making and using the invention and set forth the best mode contemplated by the inventor of carrying out his invention, but are not to be construed as limiting the scope thereof.

Preparation 1 6-Aminomorphorphanthridine (III)

*Part A 6-Chloromorphanthridine*

This compound is prepared in accordance with the procedure described in J. Heterocyclic Chem. *3*, 206.

A mixture of 20.9 g. (0.1 mole) of 5,6-dihydro - 6-morphanthridone [also named 5,11 - dihydro - 6H - dibenz[b,e] - azepin - 6 - one or 6(5H)-morphanthridinone and obtained as in J. Med. Chem. *8*, 74] and 29 g. of phosphorus pentachloride is heated to about 130° C. for about 2 hours. The mixture becomes liquid and phosphorus oxychloride starts to reflux. Fractionation in vacuum gives 20.45 g. (90% yield) of 6-chloromorphanthridine as a viscous oil having a boiling point of 162° C. at a pressure of 0.2 mm. of Hg.

Following the procedure of Part A, above, but substituting another known starting material, such as (1) 2 - chloro - 6(5H) - morphanthridinone (prepared as in Helv. Chim. Acta *48*, 336), (2) 3 - chloro - 6(5H) - morphanthridinone (ibid.), (3) 8 - chloro - 6(5H) - morphanthridinone (ibid.), (4) 3 - methyl - 6(5H) - morphanthridinone (prepared as in J. Med. Chem. *8*, 74)

(5) 8 - methyl - 6(5H) - morphanthridinone (prepared as in Helv. Chim. Acta *48*, 336), (6) 2 - chloro - 5,10 - dihydro - 11H - dibenzo[b,e][1,4]-diazepin - 11 - one (prepared as in Arzneimittel-Forsch. *13*, 324), (7) 3 - chloro - 5,10 - dihydro - 11H - dibenzo[b,e][1,4] diazepin - 11-one (ibid.), (8) 7 - chloro - 5,10 - dihydro - 5 - methyl-11H-dibenzo-[b,e][1,4]-diazepin-11-one (ibid.), (9) 8 - chloro - 5,10 - dihydro - 5 - methyl-11H-dibenzo-[b,e][1,4]-diazepin-11-one (ibid.),
(10) 5,10 - dihydro - 2 - methoxy - 5 - methyl-11H-dibenzo[b,e][1,4]diazepin-11-one (ibid.),
(11) 5,10 - dihydro - 3 - methoxy-11H-dibenzo[b,e]-[1,4]-diazepin-11-one (ibid.),
(12) 5,10 - dihydro - 7 - methoxy-11H-dibenzo[b,e]-[1,4]-diazepin-11-one (ibid.),
(13) 5,10 - dihydro - 8 - methoxy-11H-dibenzo[b,e]-[1,4]-diazepin-11-one (ibid.),
(14) 5,10 - dihydro - 11H - dibenzo[b,e][1,4]diazepin-11-one (prepared as in J. Med. Chem. 6, 767),
(15) 5,10 - dihydro - 5 - methyl - 7 - methylthio-11H-dibenzo - [b,e][1,4]diazepin - 11 - one (prepared as in Arzneimittel-Forsch. 13, 324),
(16) 5,10 - dihydro - 5 - methyl - 8 - trifluoromethyl-11H-dibenzo[b,e][1,4]diazepin-11-one (ibid.),
(17) dibenzo[b,f][1,4]thiazepin - 11(10H)-one prepared as in Netherlands Application 64 11504),
(18) 2 - bromodibenzo[b,f][1,4]thiazepin-11(10H)-one (ibid.),
(19) 2 - t - butyldibenzo[b,f][1,4]thiazepin-11 (10H)-one (ibid.),
(20) 2 - chlorodibenzo[b,f][1,4]thiazepin-11(10H)-one (ibid.),
(21) 4-chlorodibenzo[b,f][1,4]thiazepin-11(10H) - one (ibid.),
(22) 8-chlorodibenzo[b,f][1,4]thiazepin-11(10H) - one (ibid.),
(23) 1-chloro-4-methyldibenzo[b,f][1,4]thiazepin - 11-(10H)-one (ibid.),
(24) 7-chloro-4-methyldibenzo[b,f][1,4]thiazepin - 11-(10H)-one (ibid.),
(25) 8-chloro-4 - methyldibenzo[b,f][1,4]thiazepin - 11-(10H)-one (ibid.),
(26) 4,8-dichlorodibenzo[b,f][1,4]thiazepin - 11(10H)-one (ibid.),
(27) 7,8-dimethyldibenzo[b,f][1,4]thiazepin - 11(10H)-one (prepared as in British Patent 869,089),
(28) 2-fluorodibenzo[b,f][1,4]thiazepin-11(10H) - one (prepared as in Helv. Chim. Acta 48, 336),
(29) 2-methoxydibenzo[b,f][1,4]thiazepin-11(10H)-one (ibid.),
(30) 8-methoxydibenzo[b,f][1,4]thiazepin-11(10H)-one (ibid.),
(31) 2-methyldibenzo[b,f][1,4]thiazepin-11(10H) - one (ibid.),
(32) 4-methyldibenzo[b,f][1,4]thiazepin-11(10H) - one (ibid.),
(33) 6-methyldibenzo[b,f][1,4]thiazepin-11(10H) - one (prepared as in British Patent 869,089),
(34) 8-methyldibenzo[b,f][1,4]thiazepin-11(10H) - one (ibid.),
(35) dibenz[b,f][1,4]oxazepin-11(10H) - one (prepared as in Helv. Chim. Acta 48, 336),
(36) 2-bromodibenz[b,f][1,4]oxazepin - 11(10H) - one (ibid.),
(37) 1-chlorodibenz[b,f][1,4]oxazepin - 11(10H) - one (ibid.),
(38) 2-chlorodibenz[b,f][1,4]oxazepin - 11(10H) - one (ibid.),
(39) 3 - chlorodibenz[b,f][1,4]oxazepin-11(10H) - one (ibid.),
(40) 4 - chlorodibenz[b,f][1,4]oxazepin-11(10H) - one (ibid.),
(41) 6 - chlorodibenz[b,f][1,4]oxazepin-11(10H) - one (ibid.),
(42) 7 - chlorodibenz[b,f][1,4]oxazepin-11(10H) - one (ibid.),
(43) 8 - chlorodibenz[b,f][1,4]oxazepin-11(10H) - one (ibid.),
(44) 1 - chloro-4-methyldibenz[b,f][1,4]oxazepin - 11 (10H)-one (ibid.),
(45) 7 - chloro-4-methyldibenz[b,f][1,4]oxazepin - 11 (10H)-one (ibid.),
(46) 8 - chloro-4-methyldibenz[b,f][1,4]oxazepin - 11 (10H)-one (ibid.),
(47) 1,4 - dichlorodibenz[b,f][1,4]oxazepin - 11(10H)-one (ibid.),
(48) 2,4 - dichlorodibenz[b,f][1,4]oxazepin - 11(10H)-one (ibid.),
(49) 2,8 - dichlorodibenz[b,f][1,4]oxazepin - 11(10H)-one (ibid.),
(50) 4,8 - dichlorodibenz[b,f][1,4]oxazepin - 11(10H)-one (ibid.),
(51) 1,4 - dimethyldibenz[b,f][1,4]oxazepin - 11(10H)-one (ibid.),
(52) 3,4 - dimethyldibenz[b,f][1,4]oxazepin - 11(10H)-one (ibid.),
(53) 4 - ethyldibenz[b,f][1,4]oxazepin - 11(10H) - one (ibid.),
(54) 2 - fluorodibenz[b,f][1,4]oxazepin - 11(10H) - one (ibid.),
(55) 1 - methyldibenz[b,f][1,4]oxazepin - 11(10H) - one (ibid.),
(56) 2 - methyldibenz[b,f][1,4]oxazepin - 11(10H) - one (ibid.),
(57) 3 - methyldibenz[b,f][1,4]oxazepin - 11(10H) - one (ibid.),
(58) 4 - methyldibenz[b,f][1,4]oxazepin - 11(10H) - one (ibid.),
(59) 8 - chloro-2 - nitrodibenz[b,f][1,4]oxazepin - 11 (10H)-one (prepared as in Netherlands Application 66 06671),
(60) 2,7-dinitrodibenz[b,f][1,4]oxazepin - 11(10H) - one (ibid.),
(61) 2,8-dinitrodibenz[b,f][1,4]oxazepin - 11(10H) - one (ibid.),
(62) 7-methoxy - 2 - nitrodibenz[b,f][1,4]oxazepin-11 (10H)-one (ibid.),
(63) 8 - methyl - 2 - nitrodibenz[b,f][1,4]oxazepin-11 (10H)-one (ibid.),
(64) 2 - nitrodibenz[b,f][1,4]oxazepin-11(10H) - one (ibid.),
(65) 3 - nitrodibenz[b,f][1,4]oxazepin-11(10H) - one (ibid.),
(66) 7 - nitrodibenz[b,f][1,4]oxazepin-11(10H) - one (ibid.),
(67) 6,8,9 - trichloro-2 - nitrodibenz[b,f][1,4]oxazepin-11(10H)-one (ibid.),
(68) 2,7,9 - trinitrodibenz[b,f][1,4]oxazepin - 11(10H)-one (ibid.),
(69) 2 - (ethylsulfonyl) - dibenz[b,f][1,4]oxazepin-11-(10H)-one (prepared as in Helv. Chim. Acta 52, 622),
(70) 2 - (methylsulfonyl) - dibenz[b,f][1,4]oxazepin-11-(10H)-one (ibid.),
(71) 2 - (methylthio) - dibenz[b,f][1,4]oxazepin - 11 (10H)-one (ibid.),
(72) 2 - (trifluoromethyl) - dibenz[b,f][1,4]oxazepin-11(10H)-one (ibid.), etc., yields, respectively,
(1) 2,6-dichloromorphanthridine,
(2) 3,6-dichloromorphanthridine,
(3) 6,8-dichloromorphanthridine,
(4) 6-chloro-3-methylmorphanthridine,
(5) 6-chloro-8-methylmorphanthridine,
(6) 2,11-dichloro-5H-dibenzo[b,e][1,4]diazepine,
(7) 3,11-dichloro-5H-dibenzo[b,e][1,4]diazepine,
(8) 7,11-dichloro-5H-dibenzo[b,e][1,4]diazepine,
(9) 8,11-dichloro-5H-dibenzo[b,e][1,4]diazepine,
(10) 11 - chloro-2-methoxy-5H-dibenzo[b,e][1,4]diazepine,
(11) 11 - chloro-3-methoxy-5H-dibenzo[b,e][1,4]diazepine,
(12) 11 - chloro-7-methoxy-5H-dibenzo[b,e][1,4]diazepine,
(13) 11 - chloro-8-methoxy-5H-dibenzo[b,e][1,4]diazepine,
(14) 11 - chloro-5H-dibenzo[b,e][1,4]diazepine,
(15) 11 - chloro-7-methylthio-5H-dibenzo[b,e][1,4]diazepine,

(16) 11 - chloro-8-trifluoromethyl-5H-dibenzo[b,e][1,4]-diazepine,
(17) 11-chlorodibenzo[b,f][1,4]thiazepine,
(18) 2-bromo-11-chlorodibenzo[b,f][1,4]thiazepine,
(19) 2-t-butyl-11-chlorodibenzo[b,f][1,4]thiazepine,
(20) 2,11-dichlorodibenzo[b,f][1,4]thiazepine,
(21) 4,11-dichlorodibenzo[b,f][1,4]thiazepine,
(22) 8,11-dichlorodibenzo[b,f][1,4]thiazepine,
(23) 1,11-dichlorodibenzo[b,f][1,4]thiazepine,
(24) 7,11-dichlorodibenzo[b,f][1,4]thiazepine,
(25) 8,22-dichloro-4-methyldibenzo[b,f][1,4]thiazepine,
(26) 4,8,11-trichlorodibenzo[b,f][1,4]thiazepine,
(27) 11-chloro-7,8-dimethyldibenzo[b,f][1,4]thiazepine,
(28) 11-chloro-2-fluorodibenzo[b,f][1,4]thiazepine,
(29) 11-chloro-2-methoxydibenzo[b,f][1,4]thiazepine,
(30) 11-chloro-8-methoxydibenzo[b,f][1,4]thiazepine,
(31) 11-chloro-2-methyldibenzo[b,f][1,4]thiazepine,
(32) 11-chloro-4-methyldibenzo[b,f][1,4]thiazepine,
(33) 11-chloro-6-methyldibenzo[b,f][1,4]thiazepine,
(34) 11-chloro-8-methyldibenzo[b,f][1,4]thiazepine,
(35) 11-chlorodibenz[b,f][1,4]oxazepine,
(36) 2-bromo-11-chlorodibenz[b,f][1,4]oxazepine,
(37) 1,11-dichlorodibenz[b,f][1,4]oxazepine,
(38) 2,11-dichlorodibenz[b,f][1,4]oxazepine,
(39) 3,11-dichlorodibenz[b,f][1,4]oxazepine,
(40) 4,11-dichlorodibenz[b,f][1,4]oxazepine,
(41) 6,11-dichlorodibenz[b,f][1,4]oxazepine,
(42) 7,11-dichlorodibenz[b,f][1,4]oxazepine,
(43) 8,11-dichlorodibenz[b,f][1,4]oxazepine,
(44) 1,11-dichloro-4-methyldibenz[b,f][1,4]oxazepine,
(45) 7,11-dichloro-4-methyldibenz[b,f][1,4]oxazepine,
(46) 8,11-dichloro-4-methyldibenz[b,f][1,4]oxazepine,
(47) 1,4,11-trichlorodibenz[b,f][1,4]oxazepine,
(48) 2,4,11-trichlorodibenz[b,f][1,4]oxazepine,
(49) 2,8,11-trichlorodibenz[b,f][1,4]oxazepine,
(50) 4,8,11-trichlorodibenz[b,f][1,4]oxazepine,
(51) 11-chloro-1,4-dimethyldibenz[b,f][1,4]oxazepine,
(52) 11-chloro-3,4-dimethyldibenz[b,f][1,4]oxazepine,
(53) 11-chloro-4-ethyldibenz[b,f][1,4]oxazepine,
(54) 11-chloro-2-fluorodibenz[b,f][1,4]oxazepine,
(55) 11-chloro-1-methyldibenz[b,f][1,4]oxazepine,
(56) 11-chloro-2-methyldibenz[b,f][1,4]oxazepine,
(57) 11-chloro-3-methyldibenz[b,f][1,4]oxazepine,
(58) 11-chloro-4-methyldibenz[b,f][1,4]oxazepine,
(59) 8,11-dichloro-2-nitrodibenz[b,f][1,4]oxazepine,
(60) 11-chloro-2,7-dinitrodibenz[b,f][1,4]oxazepine,
(61) 11-chloro-2,8-dinitrodibenz[b,f][1,4]oxazepine,
(62) 11-chloro-7-methoxy-2-nitrodibenz[b,f][1,4]oxazepine,
(63) 11-chloro-8-methyl-2-nitrodibenz[b,f][1,4]oxazepine,
(64) 11-chloro-2-nitrodibenz[b,f][1,4]oxazepine,
(65) 11-chloro-3-nitrodibenz[b,f][1,4]oxazepine,
(66) 11-chloro-7-nitrodibenz[b,f][1,4]oxazepine,
(67) 2-nitro-6,8,9,11-tetrachlorodibenz[b,f][1,4]oxazepine,
(68) 11-chloro-2,7,9-trinitrodibenz[b,f][1,4]oxazepine,
(69) 11-chloro-2-(ethylsulfonyl)-dibenz[b,f][1,4]oxazepine,
(70) 11-chloro-2-(methylsulfonyl)-dibenz[b,f][1,4]oxazepine,
(71) 11-chloro-2-(methylthio)-dibenz[b,f][1,4]oxazepine,
(72) 11-chloro-2-(trifluoromethyl)-dibenz[b,f][1,4]oxazepine, etc.

Another compound that can be used as a starting material in Part A, but whose preparation has not heretofore been published, can be obtained by the procedure that follows:

11,11-Dimethyl-6(5H)-morphanthridinone

A mixture of 360 g. of trichloroacetic acid and 96 ml. of sulfuric acid is melted under nitrogen at about 60° C. and 53.5 g. (0.24 mole) of 10,10-dimethyl-9-anthrone (prepared as in J. Med. Chem. 7, 88) added. Then 47 g. of sodium azide is added under nitrogen, portionwise, during the course of about 4 hours. After stirring at about 70° C. for about 16 hours, an additional 23.4 g. of sodium azide is added and the mixture again kept at about 70° C, with stirring for about 16 hours. The mixture is then cooled, poured into 1 l. of ice water and neutralized to pH 9 with ammonium hydroxide. The product is extracted with 2 l. of methylene chloride, washed with water, dried and evaporated to dryness. The residue is chromatographed on 3 kg. of silica gel and eluted with 5% acetone in methylene chloride. The fractions containing the product (as shown by tlc) are combined, evaporated and the resulting solid washed successively with acetone, methylene chloride and methanol. Crystallization from 2 l. of ethyl acetate yields 41.3 g. (72.5% yield) of 11,11-dimethyl-6(5H)-morphanthridinone, having a melting point of 252 to 254° C. The compound shows only one spot by the tlc and its infrared absorption spectrum confirms its expected structure.

*Analysis.*—Calcd. for $C_{16}H_{15}NO$: C, 80.98; H, 6.37; N, 5.90. Found: C, 80.49; H, 6.39; N, 6.05.

Part B.—6-Aminomorphanthridine (III)

The hydrochloride of this compound is prepared in accordance with the procedure described in J. Heterocyclic Chem. 3, 206:

Into a stirred solution of 90 g. (0.4 mole) of 6-chloromorphanthridine (obtained as in Part A, above) in 450 g. of phenol, dry ammonia at about 100° C. is passed for about 6 hours. The phenol is removed by distillation and the residue taken up in benzene. Shaking this benzene solution with 10% aqueous hydrochloride acid precipitates the hydrochloride of 6-aminomorphanthridine (III). The crude hydrochloride is collected and dried. It is dissolved in methylene chloride, shaken with 10% aqueous sodium hydroxide solution and the methylene chloride layer washed with water, dried with sodium carbonate and evaporated to give 50 g. (59% yield) of white solid having a melting point of 163 to 165° C. A sample is recrystallized from ethyl acetate and cyclohexane to give white solid 6-aminomorphanthridine (III) having a melting point of 166.5 to 167.5° C.

*Analysis.*—Calcd. for $C_{14}H_{12}N_2$: C, 80.74; H, 5.81; N, 13.45. Found: C, 80.28; H, 5.82; N, 13.12.

Following the procedure of Part B, above, but substituting another 6-chloromorphanthridine, an 11-chloro-5H-dibenzo[b,e][1,4]diazepine, an 11-chlorodibenzo[b,f][1,4]thiazepine or an 11-chlorodibenz[b,f][1,4]oxazepine, such as (1) 2,6-dichloromorphanthridine,
(2) 3,6-dichloromorphanthridine,
(3) 6,8-dichloromorphanthridine,
(4) 6-chloro-3-methylmorphanthridine,
(5) 6-chloro-8-methylmorphanthridine,
(6) 2,11-dichloro-5H-dibenzo[b,e][1,4]diazepine,
(7) 3,11-dichloro-5H-dibenzo[b,e][1,4-diazepine,
(8) 7,11-dichloro-5H-dibenzo[b,e][1,4]diazepine,
(9) 8,11-dichloro-5H-dibenzo[b,e][1,4-diazepine,
(10) 11-chloro-2-methoxy-5H-dibenzo[b,e][1,4-]diazepine,
(11) 11-chloro-3-methoxy-5H-dibenzo[b,e][1,4]diazepine,
(12) 11-chloro-7-methoxy-5H-dibenzo[b,e][1,4]diazepine,

(13) 11-chloro-8-methoxy-5H-dibenzo[b,e][1,4]diazepine,
(14) 11-chloro-5H-dibenzo[b,e][1,4]diazepine,
(15) 11-chloro-7-methylthio-5H-dibenzo[b,e][1,4]diazepine,
(16) 11-chloro-8-trifluoromethyl-5H-dibenzo[b,e][1,4]diazepine,
(17) 11-chlorodibenzo[b,e][1,4]thiazepine,
(18) 2-bromo-11-chlorodibenzo[b,f][1,4]thiazepine,
(19) 2-t-butyl-11-chlorodibenzo[b,f][1,4]thiazepine,
(20) 2,11-dichlorodibenzo[b,f][1,4]thiazepine,
(21) 4,11-dichlorodibenzo[b,f][1,4]thiazepine,
(22) 8,11-dichlorodibenzo[b,f][1,4]thiazepine,
(23) 1,11-dichlorodibenzo[b,f][1,4]thiazepine,
(24) 7,11-dichlorodibenzo[b,f][1,4]thiazepine,
(25) 8,11-dichloro-4-methyldibenzo[b,f][1,4]thiazepine,
(26) 4,8,11-trichlorodibenzo[b,f][1,4]thiazepine,
(27) 11-chloro7,8-dimethyldibenzo[b,f][1,4]thiazepine,
(28) 11-chloro-2-fluorodibenzo[b,f][1,4]thiazepine,
(29) 11-chloro-2-methoxydibenzo[b,f][1,4]thiazepine,
(30) 11-chloro-8-methoxydibenzo[b,f][1,4]thiazepine,
(31) 11-chloro-2-methyldibenzo[b,f][1,4]thiazepine,
(32) 11-chloro-4-methyldibenzo[b,f][1,4]thiazepine,
(33) 11-chloro-6-methyldibenzo[b,f][1,4]thiazepine,
(34) 11-chloro-8-methyldibenzo[b,f][1,4]thiazepine,
(35) 11-chlorodibenzo[b,f][1,4]oxazepine,
(36) 2-bromo-11-chlorodibenzo[b,f][1,4]oxazepine,
(37) 1,11-dichlorodibenz[b,f][1,4]oxazepine,
(38) 2,11-dichlorodibenz[b,f][1,4]oxazepine,
(39) 3,11-dichlorodibenz[b,f][1,4]oxazepine,
(40) 4,11-dichlorodibenz[b,f][1,4]oxazepine,
(41) 6,11-dichlorodibenz[b,f][1,4]oxazepine,
(42) 7,11-dichlorodibenz[b,f][1,4]oxazepine,
(43) 8,11-dichlorodibenz[b,f][1,4]oxazepine,
(44) 1,11-dichloro-4-methyldibenz[b,f][1,4]oxazepine,
(45) 7,11-dichloro-4-methyldibenz[b,f][1,4]oxazepine,
(46) 8,11-dichloro-4-methyldibenz[b,f][1,4]oxazepine,
(47) 1,4,11-trichlorodibenz[b,f][1,4]oxazepine,
(48) 2,4,11-trichlorodibenz[b,f][1,4]oxazepine,
(49) 2,8,11-trichlorodibenz[b,f][1,4]oxazepine,
(50) 4,8,11-trichlorodibenz[b,f][1,4]oxazepine,
(51) 11-chloro-1,4-dimethyldibenz[b,f][1,4]oxazepine,
(52) 11-chloro-3,4-dimethyldibenz[b,f][1,4]oxazepine,
(53) 11-chloro-4-ethyldibenz[b,f][1,4]oxazepine,
(54) 11-chloro-2-fluorodibenz[b,f][1,4]oxazepine,
(55) 11-chloro-1-methyldibenz[b,f][1,4]oxazepine,
(56) 11-chloro-2-methyldibenz[b,f][1,4]oxazepine,
(57) 11-chloro-3-methyldibenz[b,f][1,4]oxazepine,
(58) 11-chloro-4-methyldibenz[b,f][1,4]oxazepine,
(59) 8,11-dichloro-2-nitrodibenz[b,f][1,4]oxazepine,
(60) 11-chloro-2,7-dinitrodibenz[b,f][1,4]oxazepine,
(61) 11-chloro-2,8-dinitrodibenz[b,f][1,4]oxazepine,
(62) 11-chloro-7-methoxy-2-nitrodibenz[b,f][1,4]oxazepine,
(63) 11-chloro-8-methyl-2-nitrodibenz[b,f][1,4]oxazepine,
(64) 11-chloro-2-nitrodibenz[b,f][1,4]oxazepine,
(65) 11-chloro-3-nitrodibenz[b,f][1,4]oxazepine,
(66) 11-chloro-7-nitrodibenz[b,f][1,4]oxazepine,
(67) 2-nitro-6,8,9,11-tetrachlorodibenz[b,f][1,4]oxazepine,
(68) 11-chloro-2,7,9-trinitrodibenz[b,f][1,4]oxazepine,
(69) 11-chloro-2-(ethylsulfonyl)-dibenz[b,f][1,4]oxazepine,
(70) 11-chloro-2-(methylsulfonyl)-dibenz[b,f][1,4]oxazepine,
(71) 11-chloro-2-(methylthio)-dibenz[b,f][1,4]
(72) 11-chloro-2-(trifluoromethyl)-dibenz[b,f][1,4]oxazepine, etc., yields, respectively, (1) 6-amino-2-chloromorphanthridine (III),
(2) 6-amino-3-chloromorphanthridine (III),
(3) 6-amino-8-chloromorphanthridine (III),
(4) 6-amino-3-methylmorphanthridine (III),
(5) 6-amino-8-methylmorphanthridine (III),
(6) 11-amino-2-chloro-5H-dibenz[b,e][1,4]diazepine (III),
(7) 11-amino-3-chloro-5H-dibenzo[b,e][1,4]diazepine (III),
(8) 11-amino-7-chloro-5H-dibenzo[b,e][1,4]diazepine (III),
(9) 11-amino-8-chloro-5H-dibenzo[b,e][1,4]diazepine (III),
(10) 11-amino-2-methoxy-5H-dibenzo[b,e][1,4]diazepine (III),
(11) 11-amino-3-methoxy-5H-dibenzo[b,e][1,4]diazepine (III),
(12) 11-amino-7-methoxy-5H-dibenzo[b,e][1,4]diazepine (III),
(13) 11-amino-8-methoxy-5H-dibenzo[b,e][1,4]diazepine (III),
(14) 11-amino-5H-dibenzo[b,e][1,4]diazepine (III),
(15) 11-amino-7-methylthio-5H-dibenzo[b,e][1,4]diazepine (III),
(16) 11-amino-8-trifluoromethyl-5H-dibenzo[b,e][1,4]diazepine (III),
(17) 11-aminodibenzo[b,f][1,4]thiazepine (III),
(18) 11-amino-2-bromodibenzo[b,f][1,4]thiazepine (III),
(19) 11-amino-2-t-butyldibenzo[b,f][1,4]thiazepine (III),
(20) 11-amino-2-chlorodibenzo[b,f][1,4]thiazepine (III),
(21) 11-amino-4-chlorodibenzo[b,f][1,4]thiazepine (III),
(22) 11-amino-8-chlorodibenzo[b,f][1,4]thiazepine (III),
(23) 11-amino-1-chlorodibenzo[b,f][1,4]thiazepine (III);
(24) 11-amino-7-chlorodibenzo[b,f][1,4]thiazepine (III);
(25) 11-amino-8-chloro-4-methyldibenzo[b,f][1,4]thiazepine (III),
(26) 11-amino-4,8-dichlorodibenzo[b,f][1,4]thiazepine (III),
(27) 11-amino-7,8-dimethyldibenzo[b,f][1,4]thiazepine (III),
(28) 11-amino-2-fluorodibenzo[b,f][1,4]thiazepine (III),
(29) 11-amino-2-methoxydibenzo[b,f][1,4]thiazepine (III),
(30) 11-amino-8-methoxydibenzo[b,f][1,4]thiazepine (III),
(31) 11-amino-2-methyldibenzo[b,f][1,4]thiazepine (III),
(32) 11-amino-4-methyldibenzo[b,f][1,4]thiazepine (III),
(33) 11-amino-6-methyldibenzo[b,f][1,4]thiazepine (III),
(34) 11-amino-8-methyldibenzo[b,f][1,4]thiazepine (III),
(35) 11-aminodibenz[b,f][1,4]oxazepine (III),
(36) 11-amino-2-bromodibenz[b,f][1,4]oxazepine (III),
(37) 11-amino-1-chlorodibenz[b,f][1,4]oxazepine (III),
(38) 11-amino-2-chlorodibenz[b,f][1,4]oxazepine (III),
(39) 11-amino-3-chlorodibenz[b,f][1,4]oxazepine (III),
(40) 11-amino-4-chlorodibenz[b,f][1,4]oxazepine (III),
(41) 11-amino-6-chlorodibenz[b,f][1,4]oxazepine (III),
(42) 11-amino-7-chlorodibenz[b,f][1,4]oxazepine (III),
(43) 11-amino-8-chlorodibenz[b,f][1,4]oxazepine (III),
(44) 11-amino-1-chloro-4-methyldibenz[b,f][1,4]oxazepine (III),

(45) 11-amino-7-chloro-4-methyldibenz[b,f][1,4] oxazepine (III),
(46) 11-amino-8-chlorodibenz[b,f][1,4] oxazepine (III),
(47) 11-amino-1,4-dichlorodibenz[b,f][1,4] oxazepine (III),
(48) 11-amino-2,4-dichlorodibenz[b,f][1,4] oxazepine (III),
(49) 11-amino-2,8-dichlorodibenz[b,f][1,4] oxazepine (III),
(50) 11-amino-4,8-dichlorodibenz[b,f][1,4] oxazepine (III),
(51) 11-amino-1,4-dimethyldibenz[b,f][1,4] oxazepine (III),
(52) 11-amino-3,4-dimethyldibenz[b,f][1,4] oxazepine (III),
(53) 11-amino-4-ethyldibenz[b,f][1,4]oxazepine (III),
(54) 11-amino-2-fluorodibenz[b,f][1,4]oxazepine (III),
(55) 11-amino-1-methyldibenz[b,f][1,4]oxazepine (III),
(56) 11-amino-2-methyldibenz[b,f][1,4]oxazepine (III),
(57) 11-amino-3-methyldibenz[b,f][1,4]oxazepine (III),
(58) 11-amino-4-methyldibenz[b,f][1,4]oxazepine (III),
(59) 11-amino-8-chloro-2-nitrodibenz[b,f][1,4] oxazepine (III),
(60) 11-amino-2,7-dinitrodibenz[b,f][1,4] oxazepine (III),
(61) 11-amino-2,8-dinitrodibenz[b,f][1,4] oxazepine (III),
(62) 11-amino-7-methoxy-2-nitrodibenz[b,f][1,4] oxazepine (III),
(63) 11-amino-8-methyl-2-nitrodibenz[b,f][1,4] oxazepine (III),
(64) 11-amino-2-nitrodibenz[b,f][1,4]oxazepine (III),
(65) 11-amino-3-nitrodibenz[b,f][1,4]oxazepine (III),
(66) 11-amino-7-nitrodibenz[b,f][1,4]oxazepine (III),
(67) 11-amino-2-nitro-6,8,9-trichlorodibenz[b,f][1,4] oxazepine (III),
(68) 11-amino-2,7,9-trinitrodibenz[b,f][1,4] oxazepine (III),
(69) 11-amino-2-(ethylsulfonyl)-dibenz[b,f][1,4] oxazepine (III),
(70) 11-amino-2-(methylsulfonyl)-dibenz[b,f][1,4] oxazepine (III),
(71) 11-amino-2-(methylthio)-dibenz[b,f][1,4] oxazepine (III),
(72) 11-amino-2-(trifluoromethyl)-dibenz[b,f][1,4] oxazepine (III), etc., Example 1A.—4-(6-Morphanthridinyl)-allophanic acid, ethyl ester (II)

A solution of 8.32 g. (0.04 mole) of 6-aminomorphanthridine (III) (obtained as in Preparation 1) in 100 ml. of tetrahydrofuran is cooled under nitrogen to about 0° C. (by an ice-salt bath) and 6 ml. (0.052 mole) of ethoxycarbonyl isocyanate added dropwise with stirring during a period of about 35 minutes. After stirring for about 4.5 hours at about 0° C., the resulting solid is collected on a filter, washed with tetrahydrofuran and ether and dried to give 3.75 g. (29.2% of theoretical yield) of white solid 4-(6-morphanthridinyl)-allophanic acid ethyl ester (II), melting at 180.5 to 182° C. and showing one spot by thin layer chromatography (tlc). The structure of the compound (II) is confirmed by infrared (ir), nuclear magnetic resonance (nmr) and mass spectrometry.

Analysis.—Calcd. for $C_{18}H_{17}N_3O_3$: C, 66.86; H, 5.30; N, 12.99. Found: C, 66.58; H, 5.29; N, 12.76.

Following the procedure of Example 1A but substituting another 6-aminomorphanthridine (III), an 11-amino-5H-dibenzo[b,e][1,4]diazepine (III), an 11-aminodibenzo[b,f][1,4]thiazepine (III) or an 11-aminodibenz[b,f][1,4] oxazepine (III), such as (1) 6-amino-2-chloromorphanthridine (III),
(3) 6-amino-8-methylmorphanthridine (III),
(3) 6-amino-11,11-dimethylmorphanthridine (III),
(4) 6-amino-11(diethylamino)morphanthridine (III),
(5) 11-amino-3-methoxy-5H-dibenzo[b,e][1,4] diazepine (III),
(6) 11-amino-7-methylthio-5H-dibenzo[b,e][1,4] diazepine (III),
(7) 11-amino-8-trifluoromethyl-5H-dibenzo[b,e][1,4] diazepine (III),
(8) 11-amino-5-methyl-5H-dibenzo[b,e][1,4] diazepine (III),
(9) 11-amino-5-(2-(dimethylamino)-ethyl]-5H-dibenzo[b,e][1,4]diazepine (III),
(10) 11-amino-5-[3-(dimethylamino)-propyl]-5H-dibenzo[b,e][1,5]diazepine (III),
(11) 11-amino-2-bromodibenzo[b,f][1,4] thiazepine (III),
(12) 11-amino-4-chlorodibenzo[b,f][1,4] thiazepine (III),
(13) 11-amino-8-chloro-4-methyldibenzo[b,f][1,4] thiazepine (III),
(14) 11-amino-7,8-dimethyldibenzo[b,f][1,4] thiazepine (III),
(15) 11-amino-2-fluorodibenzo[b,f][1,4]thiazepine (III),
(16) 11-amino-dibenzo[b,f][1,4]thiazepine (III),
(17) 11-amino-4-chlorodibenzo[b,f][1,4]oxazepine (III),
(18) 11-amino-7-chloro-4-methyldibenz[b,f][1,4] oxazepine (III),
(19) 11-amino-2,4-dichlorodibenz[b,f][1,4] oxazepine (III),
(20) 11-amino-2,7,9-trinitrodibenz[b,f][1,4] oxazepine (III),
(21) 11-aminodibenz[b.f][1,4]oxazepine (III),
(22) 11-amino-2-(ethylsulfonyl)-dibenz[b,f][1,4] oxazepine (III), etc., yields, respectively, (1) 4-(2-chloro-6-morphanthridinyl)-allophanic acid, ethyl ester (II),
(2) 4-(8-methyl-6-morphanthridinyl)-allophanic acid, ethyl ester (II),
(3) 4-(11,11-dimethylmorphanthridinyl)-allophanic acid, ethyl ester (II),
(4) 4-[11-(diethylamino)-morphanthridinyl]-allophanic acid, ethyl ester (II),
(5) 4-(3-methoxy-5H-dibenzo[b,e][1,4]diazepin-11-yl)-allophanic acid, ethyl ester (II),
(6) 4-(7-methylthio-5H-dibenzo[b,e][1,4]diazepin-11-yl)-allophanic acid, ethyl ester (II),
(7) 4-(8-trifluoromethyl-5H-dibenzo[b,e][1,4]diazepin-11-yl)-allophanic acid, ethyl ester (II),
(8) 4-(5-methyl-5H-dibenzo[b,e][1,4]diazepin-11-yl)-allophanic acid, ethyl ester (II),
(9) 4-[5-[2-(dimethylamino)-ethyl]-5H-dibenzo[b,e][1,4]-diazepin-11-yl]-allophanic acid, ethyl ester (II),
(10) 4-[5-[3-(dimethylamino)-propyl]-5H-dibenzo[b,e][1,4]diazepin-11-yl]-allophanic acid, ethyl ester (II),
(11) 4-(2-bromodibenzo[b,f][1,4]thiazepin-11-yl)-allophanic acid, ethyl ester (II),
(12) 4-(4-chlorodibenzo[b,f][1,4]thiazepin-11-yl)-allophanic acid, ethyl ester (II),
(13) 4-(8-chloro-4-methyldibenzo[b,f][1,4]thiazepin-11-yl)-allophanic acid, ethyl ester (II),
(14) 4-(7,8-dimethyldibenzo[b,f][1,4]thiazepin-11-yl)-allophanic acid, ethyl ester (II),
(15) 4-(2-fluorodibenzo[b,f][1,4]thiazepin-11-yl)-allophanic acid, ethyl ester (II),
(16) 4-(dibenzo[b,f][1,4]thiazepin-11-yl)-allophanic acid, ethyl ester (II),
(17) 4-(4-chlorodibenz[b,f][1,4]oxazepin-11-yl)-allophanic acid, ethyl ester (II),
(18) 4-(7-chloro-4-methyldibenz[b,f][1,4]oxazepin-11-yl)-allophanic acid, ethyl ester (II),
(19) 4-(2,4-dichlorodibenz[b,f][1,4]oxazepin-11-yl)-allophanic acid, ethyl ester (II),

(20) 4-(2,7,9-trinitrodibenz[b,f][1,4]oxazepin-11-yl)-allophanic acid, ethyl ester (II),
(21) 4-(dibenzo[b,f][1,4]oxazepin-11-yl)-allophanic acid, ethyl ester (II),
(22) 4-[2-(ethylsulfonyl)-dibenz[b,f][1,4]oxazepin-11-yl]-allophanic acid, ethyl ester (II), etc., Following the procedure of the immediately preceding pargraph and of Example 1A but substituting methoxycarbonyl isocyanate or propoxycarbonyl isocyanate for ethoxycarbonyl isocyanate, yields the corresponding methyl esters and propyl esters of the compounds of Formula II set forth therein.

Example 2A.—Dibenzo[c,f]-s-triazino[1,2-a]azepin-2,4 (3H,10H)-dione (Ib)

A mixture of 0.65 g. (0.002 mole) of 4-(6-morphanthridinyl)-allophanic acid, ethyl ester (II) (prepared as in Example 1A) and 25 ml. of xylene is refluxed under nitrogen, with a short air-cooled condenser, for about 2 hours. The starting material dissolves and the product (Ib) crystallizes out. The solid is collected, washed with xylene and pentane and dried to give 0.4 (79% yield) of white crystals of dibenzo[c,f]-s-triazine[1,2-a]azepine-2,4(3H,10H)-dione (Ib), having a melting point of 265 to 270° C. (with decomposition). A sample recrystallized from methanol melts at 279 to 285° C. (with decomposition) and its infrared absorption spectrum is identical with the material prepared in Example 2B, below. The infrared and nuclear magnetic resonance spectra confirm the structure proposed for this compound.

Following the procedure of Example 2A but substituting another 4-(6-morphanthridinyl)-allophanic acid, alkyl ester (II), a 4-(5H-dibenzo[b,e][1,4]diazepin-11-yl)-allophanic acid, alkyl ester (II), a 4-(dibenzo[b,f][1,4]thiazepin-11-yl)-allophanic acid, alkyl ester (II) or a 4-dibenz[b,f][1,4]oxazepin-11-yl) - allophanic acid, alkyl ester (II), such as (1) 4-(8-chloro-6-morphanthridinyl)-allophanic acid, methyl ester (II),
(2) 4-(3-methyl-6-morphanthridinyl)-allophanic acid, propyl ester (II),
(3) 4-(11,11-dimethylmorphanthridinyl)-allophanic acid, ethyl ester (II),
(4) 4-[11-(diethylamino)-morphanthridinyl]-allophanic acid, ethyl ester (II),
(5) 4-(7-chloro-5H-dibenzo[b,e][1,4]diazepin-11-yl)-allophanic acid, ethyl ester (II),
(6) 4-(2-methoxy-5H-dibenzo[b,e][1,4]diazepin-11-yl)-allophanic acid, ethyl ester (II),
(7) 4-(6-trifluoromethyl-5H-dibenzo[b,e][1,4]diazepin-11-yl)-allophanic acid, methyl ester (II),
(8) 4-(5-methyl-5H-dibenzo[b,e][1,4]diazepin-11-yl)-allophanic acid, ethyl ester (II),
(9) 4-[5-[2-(dimethylamino)-ethyl]-5H-dibenzo[b,e]-[1,4]diazepin-11-yl]-allophanic acid, ethyl ester (II),
(10) 4-[5-[3-(dimethylamino)-propyl]-5H-dibenzo[b,e]-[1,4]diazepin-11-yl]-allophanic acid, ethyl ester (II),
(11) 4-(2-t-butyldibenzo[b,f][1,4]thiazepin-11-yl)-allophanic acid, ethyl ester (II),
(12) 4-(7-chlorodibenzo[b,f][1,4]thiazepin-11-yl)-allophanic acid, propyl ester (II),
(13) 4-(8-chloro-3-methyldibenzo[b,f][1,4]thiazepin-11-yl)-allophanic acid, ethyl ester (II),
(14) 4-(4,8-dichlorodibenzo[b,f][1,4]thiazepin-11-yl)-allophanic acid, methyl ester (II),
(15) 4-(8-methoxydibenzo[b,f][1,4]thiazepin-11-yl)-allophanic acid, ethyl ester (II),
(16) 4-(dibenzo[b,f][1,4]thiazepin-11-yl)-allophanic acid, ethyl ester (II),
(17) 4-(2-bromodibenz[b,f][1,4]oxazepin-11-yl)-allophanic acid, ethyl ester (II),
(18) 4-(3-chlorodibenz[b,f][1,4]oxazepin-11-yl)-allophanic acid, ethyl ester (II),
(19) 4-(1-chloro-4-methyldibenz[b,f][1,4]oxazepin-11-yl)-allophanic acid, methyl ester (II),
(20) 4-(8-chloro-2-nitrodibenz[b,f][1,4]oxazepin-11-yl)-allophanic acid, methyl ester (II),
(21) 4-(dibenzo[b,f][1,4]oxazepin-11-yl)-allophanic acid, ethyl ester (II),
(22) 4-(6,8,9-trichlorodibenz[b,f][1,4]oxazepin-11-yl)-allophanic acid, ethyl ester (II), etc.;

yields, respectively, (1) 13-chlorodibenzo[c,f]-s-triazino[1,2-a]azepin-2,4 (3H,10H)-dione (Ib),
(2) 7-methyldibenzoic[c,f]-s-triazino[1,2-a]azepine-2,4(3H,10H)-dione (Ib),
(3) 10,10-dimethyldibenzo[c,f]-s-triazino[1,2-a]azepine-2,4(3H,10H)-dione (Ib),
(4) 10-(diethylamino)dibenzo[c,f]-s-triazino[1,2-a] azepine-2,4(3H,10H)-dione (Ib),
(5) 8-chlorodibenzo[b,f]-s-triazino[1,2-d][1,4]diazepine-2,4(3H,10H)-dione (Ib),
(6) 13-methoxydibenzo[b,f]-s-triazino[1,2-d][1,4]diazepine-2,4(3H,10H)-dione (Ib),
(7) 9-trifluoromethyldibenzo[b,f]-s-triazino[1,2-d][1,4]diazepine-2,4(3H,10H)-dione (Ib),
(8) 10-methyldibenz[b,f]-s-triazino[1,2-d][1,4]diazepine-2,4(3H,10H)-dione (Ib),
(9) 10-[2-(dimethylamino)-ethyl]-dibenzo[b,f]-s-triazino[1,2-d][1,4]diazepine-2,4(3H,10H)-dione (Ib),
(10) 10-[3-(dimethylamino)-propyl]-dibenzo[b,f]-s-triazino[1,2-d][1,4]diazepine-2,4(3H,10H)-dione (Ib),
(11) 13-t-butyl-2H-dibenzo[b,f]-s-triazino[1,2-d][1,4] thiazepine-2,4(3H)-dione (Ib),
(12) 8-chloro-2H-dibenzo[b,f]-s-triazino[1,2-d][1,4] thiazepine-2,4(3H)-dione (Ib),
(13) 7-chloro-2H-dibenzo[b,f]-s-triazino[1,2-d][1,4] thiazepine-2,4(3H)-dione (Ib),
(14) 7,11-dichloro-2H-dibenzo[b,f]-s-triazino[1,2-d] [1,4]thiazepine-2,4(3H)-dione (Ib),
(15) 7-methoxy-2H-dibenzo[b,f]-s-triazino[1,2-d] [1,4]thiazepine-2,4(3H)-dione (Ib),
(16) 2H-dibenzo[b,f]-s-triazino[1,2-d][1,4]thiazepine-2,4(3H)-dione (Ib),
(17) 13-bromo-2H-dibenzo[b,f]-s-triazino[1,2-d] [1,4]oxazepine-2,4(3H)-dione (Ib),
(18) 12-chloro-2H-dibenz[b,f]-s-triazino[1,2-d] [1,4]oxazepine-2,4(3H)-dione (Ib),
(19) 14-chloro-11-methyl-2H-dibenz[b,f]-s-triazino-[1,2-d][1,4]oxazepine-2,4(3H)-dione (Ib),
(20) 7-chloro-13-nitro-2H-dibenz[b,f]-s-triazino[1,2-d] [1,4]oxazepine-2,4(3H)-dione (Ib),
(21) 2H-dibenzo[b,f]-s-triazion[1,2-d][1,4]thiazepine-2,4(3H)-dione (Ib),
(22) 6,7,9-trichloro-2H-dibenz[b,f]-s-triazino[1,2-d] [1,4]oxazepine-2,4(3H)-dione (Ib), etc.

Example 1B.—2,10-Dihydro-2,4-dioxo-dibenzo[c,f] - s-triazino[1,2-a]azepine-3(4H)-carboxylic acid, ethyl ester (Ia)

A solution of 4.16 g. (0.02 mole) of 6-aminomorphanthridine (III) in 50 ml. of tetrahydrofuran is cooled under nitrogen to about —78° C. by solid carbon dioxide, and during a period of about 20 minutes 5.8 ml. (0.05 mole) of ethoxycarbonyl isocyanate is slowly added thereto with stirring. This solution is then allowed to warm to room temperature and stirred for about 2 hours. Solid material separates and after standing for about 16 hours the mixture is evaporated, purged with toluene and recrystallized from about 250 ml. of 2-methoxyethanol to give 3 g. (60% yield) of nearly white solid 2,10-dihydro-2,4 - dioxodibenzoic[c,f] - 2-triazino[1,2-a] azepine-3(4H)-carboxylic acid, ethyl ester (Ia), having a melting point of 236 to 237° C. (with decomposition) and showing only one spot on its thin layer chromatogram. The structure of the compound (Ia) is confirmed by IR, NMR and mass spectrometry.

*Analysis.*—Calcd. for $C_{19}H_{15}N_3O_4$: C, 65.32; H, 4.33; N, 12.03. Found: C, 65.09; H, 4.44; N, 11.48.

Example 1C.—10-[2 - (dimethylamino)-ethyl]-2,10-dihydro-2,4-dioxo-dibenzo[b,f] - s - triazino[1,2-d][1,4]diazepine-3(4H)-carboxylic acid, ethyl ester (Ia)

A solution of 2.8 g. (0.01 mole) of 11-amino-5-[2-(dimethylamino)-ethyl] - 5H-dibenzo[b,e][1,4]diazepine (III) in 25 ml. of tetrahyrofuran is cooled under nitrogen to about —70° C. with solid carbon dioxide. To this is slowly added, with stirring, during a period of about 20 minutes, 2.9 ml. (0.025 mole) of ethoxycarbonyl isocyanate. After stirring at room temperature for about 16 hours, the mixture is evaporated, purged with toluene, chromatographed over a 350 g. column of silica gel (colloidal silica), and eluated with 15 ml. portions of methanol is chloroform. The product is recrystallized from ether to give 580 mg. 14% yield) of white crystals of 10-[2-(dimethylamino)ethyl] - 2,10 - dihydro-2,4-dioxodibenzo[b,f]-s-triazino[1,2-d][1,4]diazepine (Ia) with a melting point of 183 to 184° C. The infrared absorption, nuclear magnetic resonance and mass spectra of the compound confirm its expected structure.

*Analysis.*—Calcd. for $C_{22}H_{23}N_5O_4$: C, 62.69; H, 5.50; N, 16.62. Found: C, 62.67; H, 5.55; N, 16.66.

Following the procedure of Example 1B or 1C but substituting another 6-aminomorphanthridine (III), an 11-amino-5H-dibenzo[b,e][1,4]diazepine (III), an 11-aminodibenzo[b,f][1,4]thiazepine (III) or an 11-aminodibenzo[b,f][1,4]oxazepine (III), such as (1) 6-amino-8-chloromorphanthridine (III),
(2) 6-amino-7-ethylmorphanthridine (III),
(3) 6-amino-11,11-dimethylmorphanthridine (III),
(4) 6-amino-11-(diethylamino)-morphanthridine (III),
(5) 11-amino-3-bromo-5H-dibenzo[b,e][1,4]diazepine (III),
(6) 11-amino-5-methyl-5H-dibenzo[b,e][1,4]diazepine (III),
(7) 11-amino-7-chloro-5H-dibenzo[b,e][1,4]diazepine (III),
(8) 11-amino-8-methoxy-5H-dibenzo[b,e][1,4]diazepine (III),
(9) 11-amino-7-propylthio-5H-dibenzo[b,e][1,4]diazepine (III),
(10) 11-amino-5-[3-(dimethylamino)-propyl]-5H-dibenzo[b,e][1,4]diazepine (III),
(11) 11-amino-7-chloro-3-ethyldibenzo[b,f][1,4]thiazepine (III),
(12) 11-amino-8-chloro-4-ethoxydibenzo[b,f][1,4]thiazepine (III),
(13) 11-amino-dibenzo[b,f][1,4]thiazepine (III),
(14) 11-amino-7-ethyl-8-methyldibenz[b,f][1,4]oxazepine (III),
(15) 11-amino-2-chloro-4-ethyldibenz[b,f][1,4]oxazepine (III), etc., yields, respectively, (1) 2,10-dihydro-2,4-dioxo-13-chlorodibenzo[c,f]-s-triazino[1,2-a]azepine-3(4H)-carboxylic acid, ethyl ester (Ia),
(2) 2,10-dihydro-2,4-dioxo-14-ethyldibenzo[c,f]-s-triazino[1,2-a]azepine-3(4H)-carboxylic acid, ethyl ester (Ia),
(3) 2,10-dihydro-2,4-dioxo10,10-dimethyldibenzo[c,f]-s-triazino[1,2-a]azepine-3(4H)-carboxylic acid, ethyl ester (Ia),
(4) 2,10-dihydro-2,4-dioxo-10-(diethylamino)-dibenzo[c,f]-s-triazino[1,2-a]azepine-3(4H)-carboxylic acid, ethyl ester (Ia),
(5) 2,10-dihydro-2,4-dioxo-7-bromodibenzo[b,f]-s-triazino[1,2-d][1,4]diazepine-3(4H)-carboxylic acid, ethyl ester (Ia),
(6) 2,10-dihydro-2,4-dioxo-10-methyldibenzo[b,f]-s-triazino[1,2-d][1,4]diazepine-3(4H)-carboxylic acid, ethyl ester (Ia),
(7) 2,10-dihydro-2,4-dioxo-14-chlorodibenzo[b,f]-s-triazino[1,2-d][1,4]diazepine-3(4H)-carboxylic acid, ethyl ester (Ia),
(8) 2,10-dihydro-2,4-dioxo-13-methoxydibenzo[b,f]-s-triazino[1,2-d][1,4]diazepine-3(4H)-carboxylic acid, ethyl ester (Ia),
(9) 2,10-dihydro-2,4-dioxo-14-propylthiodibenzo[b,f]-s-triazino[1,2-d][1,4]diazepine-3(4H)-carboxylic acid, ethyl ester (Ia),
(10) 10-[3-(dimethylamino)-ethyl]-2,10-dihydro-2,4-dioxodibenzo[b,f]-s-triazino[1,2-d][1,4]diazepine-3(4H)-carboxylic acid, ethyl ester (Ia),
(11) 2,10-dihydro-2,4-dioxo-8-chloro-12-ethyldibenzo[b,f]-s-triazino[1,2-d][1,4]thiazepine-3(4H)-carboxylic acid, ethyl ester (Ia),
(12) 2,10-dihydro-2,4-dioxo-7-chloro-11-ethoxydibenzo[b,f]-s-triazino[1,2-d][1,4]thiazepine-3(4H)-carboxylic acid, ethyl ester (Ia),
(13) 2,10-dihydro-2,4-dioxo-dibenzo[b,f]-s-triazino[1,2-d][1,4]thiazepine-3(4H)-carboxylic acid, ethyl ester (Ia),
(14) 2,10-dihydro-2,4-dioxo-8-ethyl-7-methyldibenzo[b,f]-s-triazino[1,2-d][1,4]oxazepine-3(4H)-carboxylic acid, ethyl ester (Ia),
(15) 2,10-dihydro-2,4-dioxo-13-chloro-11-ethyldibenzo[b,f]-s-triazino[1,2-d][1,4]oxazepine-3(4H)-carboxylic acid, ethyl ester (Ia), etc.

Following the procedure of the immediately preceding paragraph and of Example 1A but substituting methoxycarbonyl isocyanate or propoxycarbonyl isocyanate for ethoxycarbonyl isocyanate, yields the corresponding methyl esters and propyl esters of the compounds of Formula Ia set forth therein.

Example 2B.—Dibenzo[c,f]-s-triazino[1,2-a]azepine-2,4(3H,10H)-dione (Ib)

A suspension of 4.2 g. (0.012 mole) of 2,10-dihydro-2,4 - dioxo-dibenzo[c,f]-s-triazino[1,2-a]azepine-3(4H)-carboxylic acid, ethyl ester (Ia) (prepared as in Example 1B) in 60 ml. of ethanol and 6.4 g. (0.128 mole) of hydrazine hydrate is stirred while heating under reflux under nitrogen for about 4 hours. After standing at room temperature for about 16 hours, the product is collected, washed with ethanol and dried to give 2.66 g. (80% yield) of white crystalline dibenzo[c,f]-s-triazino[1,2-a]azepine-2,4(3H,10H)-dione (Ib), showing only one spot by t.l.c., with a melting point of 283 to 285° C. (with decomposition). A sample recrystallized from methanol melts at 285 to 287.5° C. (with decomposition). Its IR spectrum is identical with that of the compound prepared in Example 2A and together with its NMR spectrum confirms its structure.

*Analysis.*—Calcd. for $C_{16}H_{11}N_3O_2$: C, 69.31; H, 4.00; N, 15.15. Found: C, 69.31; H, 4.11; N, 14.95.

Example 2C.—10 - [2 - (dimethylamino)-ethyl]-dibenzo[b,f]-s-triazino[1,2 - d][1,4]diazepine - 2,4(3H,10H)-dione (Ib)

To a mixture of 1 g. (0.0024 mole) of 10-[2-(dimethylamino)-ethyl]-2,10-dihydro - 2,4 - dioxo-dibenzo[b,f]-s-triazino[1,2-d][1,4]diazepine - 3(4H) - carboxylic acid, ethyl ester (Ia) (obtained as in Example 1C) in 25 ml. of ethanol, 0.15 ml. (0.15 mole) of hydrazine hydrate is added under nitrogen and the solution refluxed for about 5 hours. After cooling, the resulting crystals are collected and washed with ethanol to give 530 mg. (62% yield) of crystalline solid 10-[2 - (dimethylamino)-ethyl]-dibenzo[b,f] - s - triazino[1,2-d][1,4]diazepine - 2,4(3H,10H)-dione (Ib), having a melting point of 161 to 162° C. Thin layer chromatography of the compound showed one spot and its infrared absorption spectrum and mass spectrum were in accordance with its expected structure.

*Analysis.*—Calcd. for $C_{19}H_{19}N_5O_2$: C, 65.31; H, 5.48; N, 20.05. Found: C, 65.36; H, 5.67; N, 19.94.

Following the procedure of Example 2B or 2C but substituting another 2,10-dihydro-2,4-dioxo-dibenzo[c,f]-s-triazino[1,2-a]azepine - 3(4H) - carboxylic acid, alkyl ester (Ia), a 2,10 - dihydro-2,4-dioxo-dibenzo[b,f]-s-triazino[1,2-d][1,4]diazepine-3(4H)-carboxylic acid, alkyl ester (Ia), a 2,10 - dihydro-2,4-dioxo-dibenzo[b,f]-s-triazino[1,2-d][1,4]thiazepine-3(4H)-carboxylic acid, alkyl ester (Ia), or a 2,10 - dihydro-2,4-dioxo-dibenzo[b,f]-s-triazino[1,2-d][1,4]oxazepine - 3(4H) - carboxylic acid, alkyl ester (Ia), such as (1) 2,10-dihydro-2,4-dioxo-8-bromodibenzo[c,f]-s-triazino[1,2-a]azepine-3(4H)-carboxylic acid, methyl ester (Ia), (2) 2,10-dihydro-2,4-dioxo-7-methyldibenzo[c,f]-s-triazino[1,2-a]azepine-3(4H)-carboxylic acid, ethyl ester (Ia), (3) 2,10-dihydro-2,4-dioxo-10,10-dimethyldibenzo[c,f]-s-triazino[1,2-a]azepine-3(4H)-carboxylic acid, ethyl ester (Ia), (4) 2,10-dihydro-2,4-dioxo-10-(dimethylamino)-dibenzo[c,f]-s-triazino[1,2-a]azepine-3(4H)-carboxylic acid, ethyl ester (Ia), (5) 2,10-dihydro-2,4-dioxo-11-chlorodibenzo[c,f]-s-triazino[1,2-d][1,4]diazepine-3(4H)-carboxylic acid, propyl ester (Ia), (6) 2,10-dihydro-2,4-dioxo-6-fluorodibenzo[b,f]-s-triazino[1,2-d][1.4]diazepine-3(4H)-carboxylic acid, methyl ester (Ia), (7) 2,10-dihydro-2,4-dioxo-8-ethoxydibenzo[b,f]-s-triazino[1,2-d][1,4]diazepine-3(4H)-carboxylic acid, ethyl ester (Ia), (8) 2,10-dihydro-2,4-dioxo-9-methylthiodibenzo[b,f]-s-triazino[1,2-d][1,4]diazepine-3(4H)-carboxylic acid, methyl ester (Ia), (9) 2,10-dihydro-2,4-dioxo-10-methyldibenzo[b,f]-s-triazino[1,2-d][1,4]diazepine-3(4H)-carboylic acid, ethyl ester (Ia),

(10) 2,10-dihydro-10-[3-(dimethylamino)-propyl]-2,4-dioxo-dibenzo[b,f]-s-triazino[1,2-d][1,4]diazepine-3-(4H)-carboxylic acid, ethyl ester (Ia),

(11) 2,10-dihydro-2,4-dioxo-7-bromo-11-propyldibenzo-[b,f]-s-triazino[1,2-d][1,4]thiazepine-3(4H)-carboxylic acid, propyl ester (Ia),

(12) 2,10-dihydro-2,4-dioxo-8-chloro-12-methoxydibenzo-[b,f]-s-triazino[1,2-d][1,4]thiazepine-3(4H)-carboxylic acid, methyl ester (Ia),

(13) 2,10-dihydro-2,4-dioxo-dibenzo[b,f]-s-triazino-[1,2-d][1,4]thiazepine-3(4H)-carboxylic acid, ethyl ester (Ia),

(14) 2,10-dihydro-2,4-dioxo-8-methoxy-13-nitrodibenzo-[b,f]-s-triazino[1,2-d][1,4]oxazepine-3(4H)-carboxylic acid, ethyl ester (Ia),

(15) 2,10-dihydro-2,4-dioxo-7,9-dimethyldibenzo[b,f]-s-triazino[1,2-d][1,4]oxazepine-3(4H)-carboxylic acid, propyl ester (Ia), etc.

yields, respectively, (1) 8-bromodibenzo[c,f]-s-triazino[1,2-a]azepine-2,4-(3H,10H)-dione (Ib), (2) 7-methyldibenzo[c,f]-s-triazino[1,2-a]azepine-2,4-(3H,10H)-dione (Ib), (3) 10,10-dimethyldibenzo[c,f]-s-triazino[1,2-a]azepine-2,4(3H,10H)-dione (Ib), (4) 10-diethylaminodibenzo[c,f]-s-triazino[1,2-a]azepine-2,4(3H,10H)-dione( Ib), (5) 11-chlorodibenzo[b,f]-s-triazino[1,2-d][1,4]diazepine-2,4(3H,10H)-dione, (Ib), (6) 6-fluorodibenzo[b,f]-s-triazino[1,2-d][1,4]diazepine-2,4(3H,10H)-dione, (Ib), (7) 8-ethoxydibenzo[b,f]-s-triazino[1,2-d][1,4]diazepine-2,4(3H,10H)-dione, (Ib), (8) 9-methylthiodibenzo[b,f]-s-triazino[1,2-d][1,4]diazepine-2,4(3H,10H)-dione, (Ib), (9) 10-methyldibenzo[b,f]-s-triazino[1,2-d][1,4]diazepine-2,4(3H,10H)-dione, (Ib),

(10) 10-[3-(dimethylamino)-propyl]-dibenzo[3,f]-s-triazino[1,2-d][1,4]diazepine-2,4(3H,10H)-dione (Ib),

(11) 7-bromo-11-propyl-2H-dibenzo[b,f]-s-triazino-[1,2-d][1,4]thiazepine-2,3(3H)-dione (Ib),

(12) 8-chloro-12-methoxy-2H-dibenzo[b,f]-s-triazino-[1,2-d][1,4]thiazepine-2,4(3H)-dione (Ib),

(13) 2H-dibenzo[b,f]-s-triazino[1,2-d][1,4]thiazepine-2,4(3H)-dione (Ib),

(14) 8-methoxy-13-nitro-2H-dibenzo[b,f]-s-triazino-[1,2-d][1,4]oxazepine-2,4(3H)-dione (Ib),

(15) 7,9-dimethyl-2H-dibenzo[b,f]-s-triazino[1,2-d]-[1,4]oxazepine-3,4(3H)-dione (Ib), etc.

Example 3.—3-[2-(Dimethylamino)-ethyl]-dibenzo[c,f]-s-triazino[1,2-a]azepine-2,4(3H,10H)-dione (Ic)

To a solution of 1.39 g. (0.005 mole) of dibenzo[c,f]-s-triazino[1,2-a]azepine - 2,4(3H,10H)-dione (Ib) (prepared as in Example 2A or 2B) in 50 ml. of dimethylformamide under nitrogen, 250 mg. of 57% sodium hydride in mineral oil is added. The mixture is stirred at about 95° C. for about 40 minutes and then 5 ml. (0.01 mole) of 2 molar 2-(dimethylamino)ethyl chloride in benzene is added. After stirring at about 95° C. for about 7 hours and standing at room temperature for about 72 hours, the mixture is filtered and the solid sodium chloride extracted with dimethylformamide. The dimethylformamide solutions are evaporated under vacuum, the residue treated with water and well extracted with methylene chloride. The methylene chloride is extracted with cold 10% aqueous hydrochloric acid and the acid extracts basified with cold dilute aqueous sodium hydroxide solution. The resulting product is extracted with methylene chloride, washed with water and dried over sodium sulfate. After filtration and evaporation under vacuum, the residue is crystallized from 2-propanol to give 0.76 g. (43.5% yield) of white crystalline 3-[2-(dimethylamino)-ethyl]dibenzo[c,f] - s - triazino[1,2-a]azepino - 2,4(3H, 10H)-dione (Ic), showing a single spot with tlc and melting at 226 to 228.5° C. The structure of the compound is confirmed by ir, nmr and mass spectrometry.

*Analysis.*—Calcd. for $C_{20}H_{20}N_4O_2$: C, 68.95; H, 5.79; N, 16.08. Found: C, 68.84; H, 5.77; N, 16.03.

Following the procedure of Example 3 but substituting another dibenzo[c,f] - s - triazino[1,2-a]azepine-2,4(3H, 10H)-dione (Ib),a dibenzo [b,f]-s-triazino[1,2-d][1,4]diazepine-2,4(3H,10H)-dione (Ib), a 2H-dibenzo[b,f]-s-triazino[1,2-d][1,4]thiazepine-2,4(3H) - dione (Ib) or a 2H-dibenzo[b,f] - s - triazino[1,2-d][1,4]oxazepine-2,4-(3H)-dione (Ib), such as (1) 10,10-dimethyldibenzo[c,f]-s-triazino[1,2-a]azepine-2,4(3H,10H)-dione (Ib), (2) 10-diethylaminodibenzo[c,f]-s-triazino[1,2-a]azepine-2,4(3H,10H)-dione (Ib), (3) 10-allyldibenzo[e,f]-s-triazino[1,2-a]azepine-3,4(3H,10H)-dione, (Ib), (4) 8-bromodibenzo[b,f]-s-triazino[1,2-a][1,4]diazepine-2,4(3H,10H)-dione (Ib), (5) 12-ethoxydibenzo[b,f]-s-triazino[1,2-a][1,4]-diazepine-2,4(3H,10H)-dione (Ib), (6) 10-methyldibenzo[b,f]-s-triazino[1,2-d][1,4]-diazepine-2,4(3H,10H)-dione (Ib), (7) 13-*t*-butyl-2H-dibenzo[b,f]-s-triazino[1,2-d][1,4]-thiazepine-2,4(3H)-dione (Ib), (8) 8,12-dichloro-2H-dibenzo[b,f]-s-triazino[1,2-d]-[1,4]thiazepine-2,4(3H)-dione (Ib), (9) 2H-dibenzo[b,f]-s-triazino[1,2-d][1,4]thiazepine-2,4-(3H)-dione (Ib),

(10) 11-bromo-2H-dibenzo[b,f]-s-triazino[1,2-d][1,4]-oxazepine-2,4(3H)-dione (Ib),
(11) 8-ethoxy-12-chloro-2H-dibenzo[b,f]-s-triazino-[1,2-d][1,4]oxazepine-2,4(3H)-dione (Ib),
(12) 2H-dibenzo[b,f]-s-triazino[1,2-d][1,4]oxazepine-2,4(3H)-dione (Ib), etc.

yields, respectively,
(1) 3-[2-(dimethylamino)-ethyl]-10,10-dimethyldibenzo-[c,f]-s-triazino[1,2-a]azepine-2,4(3H,10H)-dione (Ic),
(2) 3-[2-(dimethylamino)-ethyl] - 10 - diethylaminodibenzo-[c,f]-s-triazino[1,2 - a]azepine - 2,4(3H,10H)-dione (Ic),
(3) 3-[2-(dimethylamino)-ethyl]-10-allyldibenzo[c,f] - s-triazino[1,2-a]azepine-2,4(3H,10H)-dione (Ic),
(4) 3-[2-(dimethylamino)-ethyl]-8-bromodibenzo[b,f]-s-triazino[1,2-d][1,4]diazepine-2,4(3H,10H)-dione (Ic),
(5) 3-[2-(dimethylamino)-ethyl]-12-ethoxydibenzo[b,f]-s-triazino[1,2-d][1,4]diazepine - 2,4(3H,10H) - dione (Ic),
(6) 3-[2-(dimethylamino)-ethyl-10 - methyldibenzo[b,f]-s-triazino-[1,2-d][1,4]diazepine - 2,4(3H,10H) - dione (Ic),
(7) 3-[2-(dimethylamino)-ethyl]-13-t-butyl-2H - dibenzo-[b,f]-s-triazino[1,2-d][1,4]thiazepine - 2,4(3H) - dione (Ic),
(8) 3-[2-(dimethylamino)-ethyl]-8,12-dichloro - 2H - dibenzo[b,f]-s-triazino[1,2 - d][1,4]thiazepine - 2,4(3H,10H)-dione (Ic),
(9) 3-[2-(dimethylamino)-ethyl]-2H - dibenzo[b,f] - s-triazino[1,2-d][1,4]thiazepine-2,4(3H,10H)-dione (Ic),
(10) 3-[2-(dimethylamino)-ethyl]-11-bromo-2H-dibenzo-[b,f]-s-triazino[1,2-d][1,4]oxazepine - 2,4(3H) - dione (Ic),
(11) 3-[2-(dimethylamino)-ethyl]-8-ethoxy-11 - chloro-2H-dibenzo[b,f] - s - triazino[1,2 - d][1,4]oxazepine-2,4(3H)-dione (Ic),
(12) 3-[2-(dimethylamino)-ethyl]-2H - dibenzo[b,f] - s-triazino[b,f][1,4]oxazepine-2,3(3H)-dione (Ic), etc.

Following the procedures of the immediately preceding paragraph and of Example 3, but substituting another compound embraced by the formula R₃'X (defined as above) for the 2-(dimethylamino)ethyl chloride employed in Example 3, i.e., heating a representative compound of Formula Ib (after first heating it with sodium hydride) with a typical compound of the formula R₃'X, such as (1) dibenzo[c,f]-s-triazino[1,2-a]azepine - 2,4(3H,10H)-dione (Ib) and ethyl bromide,
(2) 8-chlorodibenzo[c,f] - s - triazino[1,2-a]azepine-2,4(3H,10H)-dione (Ib), and allyl chloride,
(3) 12-ethyldibenzo[c,f] - s - triazino[1,2-a]azepine-2,4(3H,10H)-dione (Ib) and 2-ethoxyethyl bromide,
(4) 7-fluorodibenzo[c,f] - s - triazino[1,2-a]azepine-2,4(3H,10H)-dione (Ib) and 2-methoxyethylbromide,
(5) dibenzo[c,f] - s - triazino[1,2-a]azepine - 2,4(3H,10H)-dione (Ib) and 3-(dimethylamino)-propyl chloride,
(6) 12-propyldibenzo[c,f] - s - triazino[1,2 - a]azepine-2,4(3H,10H)-dione (Ib) and 3-ethoxypentyl bromide,
(7) 8,9-dibromodibenzo[c,f]-s-triazino[1,2-a]azepine-2,4(3H,10H)-dione (Ib) and 2-(diethylamino)ethyl bromide,
(8) 7-chloro-9-methyldibenzo[c,f] - s - triazino[1,2 - a]-azepine-2,4(3H,10H)-dione (Ib) and 3-(methylpropylamino)-propyl methanesulfonate,
(9) 8-fluoro-12-propyldibenzo[c,f] - s - triazino[1,2-a]-azepine-2,4(3H,10H)-dione (Ib) and 6-(ethylmethylamino)hexyl iodide,
(10) 9-ethoxy-13-methoxydibenzo[c,f]-s-triazino[1,2 - a]-azepine-2,4(3H,10H)-dione (Ib) and pyrrolidinoethyl chloride,

(11) 8,13-diethoxydibenzo[c,f]-s-triazino[1,2-a]-azepine-2,4(3H,10H)-dione (Ib) and 3-(2,6 - dimethylpiperidino)-propyl bromide,
(12) 7,12-difluorodibenzo[c,f]-s-triazino[1,2 - a]azepine-2,4(3H,10H)-dione (Ib) and 3-ethylmorpholinoethyl bromide,
(13) 6,14-dimethyldibenzo[c,f]-s-triazino[1,2 - a]azepine-2,4(3H,10H)-dione (Ib) and 2-(thiomorpholino)ethyl chloride,
(14) 9-bromo-13-ethyldibenzo[c,f] - s - triazino[1,2 - a]-azepine-2,4(3H,10H)-dione (Ib) 4-methyl-1-(2-bromoethyl)-piperazine,
(15) 8-chloro-12-methyldibenzo[c,f] - s - triazino[1,2-a]-azepine-2,4(3H,10H)-dione (Ib) and 2,4-diethyl-1-(2-chloroethyl)piperazine,
(16) dibenzo[b,f]-s-triazino[1,2 - d][1,4]diazepine - 2,4(3H,10H)-dione (Ib) and methyl iodide,
(17) 10-[2-(dimethylamino)-ethyl]-9 - bromodibenzo[b,f]-s-triazino[1,2-d][1,4]diazepine-2,4(3H,10H) - dione (Ib) and 3-methoxypropyl benzenesulfonate,
(18) 6-chloro-10-[3-(dimethylamino) - propyl - dibenzo-[b,f]-s-triazino[1,2 - d][1,4]diazepine - 2,4(3H,10H)-dione (Ib) and isobutyl bromide,
(19) 10-methyldibenzo[b,f] - s - triazino[1,2 - d][1,4]-diazepine-2,4(3H,10H)-dione (Ib) and (1-pyrrolidyl)-ethyl chloride,
(20) 8-dimethylamino-10-[2-(1 - pyrrolidyl)-ethyl] - dibenzo[b,f]-s - triazino[1,2-d][1,4]diazepine - 2,4(3H,10H)-dione (Ib) and allyl bromide,
(21) 10-allyl-9-fluorodibenzo[b,f] - s - triazino[1,2 - d]-[1,4]diazepine-2,4(3H,10H)-dione (Ib) and 2-(diethylamino)-propyliodide
(22) 11-ethyldibenzo[b,f] - s - triazino[1,2 - d][1,4]diazepine-2,4(3H,10H)-dione (Ib) and 2-(ethylmethylamino)ethyl bromide,
(23) 10-(2-methoxyethyl)-8-chlorodibenzo[b,f] - s - triazino[1,2-d][1,4]diazepine-2,4(3H,10H) - dione (Ib) and 4-(dimethylamino)-butyl iodide,
(24) 11-chloro-9-fluoro - 10 - methyldibenzo[b,f] - s - triazino[1,2-d][1,4]diazepine-2,4(3H,10H) - dione (Ib) and 5-(ethylmethylamino)pentyl iodide.
(25) 10-ethyl-12-fluorodibenzo[b,f] - s - triazino[1,2-d]-[1,4]diazepine-2,4(3H,10H)-dione and 3-(3-ethylpyrrolidino)-propyl sulfonate,
(26) 10-crotyl-6-ethoxy-14-methoxydibenzo[b,f] - s - triazino[1,2-d][1,4]diazepine-2,4(3H,10H) - dione (Ib) and 2-(2,4-dimethylpyrrolidino)ethyl bromide,
(27) 7-ethyl-14-fluoro - 10 - methyldibenzo[b,f] - s - triazino[1,2-d][1,4]diazepine-2,4(3H,10H) - dione (Ib) and 3-ethylpiperidinoethyl chloride,
(28) 10-(2-dimethylamino)ethyl]-dibenzo[b,f] - s - triazino[1,2-d][1,4]diazepine-2,4(3H,10H) - dione (Ib) and 2-morpholinoethyl bromide,
(29) 8,10,11-trimethyldibenzo[b,f] - s - triazino[1,2-d]-[1,4]diazepine-2,4(3H,10H)-dione (Ib) and 2-(3-ethylthiomorpholino)-ethyl chloride,
(30) 10-ethyldibenzo[b,f] - s - triazino[1,2-d][1,4]-diazepine-2,4(3H,10H)-dione (Ib) and 4 - methylpiperazinoethyl iodide,
(31) 2H-dibenzo[b,f] - s - triazino[1,2-d][1,4]thiazepine-2,4(3H)-dione (Ib) and 2-(dimethylamino)-ethyl chloride,
(32) 8-bromo-2H-dibenzo[b,f] - s - triazino[1,2-d][1,4]-thiazepine-2,4(3H) - dione (Ib) and 2 - ethoxypropyl bromide,
(33) 2H-9-chlorodibenzo[b,f] - s - triazino[1,2-d][1,4]-thiazepine-2,4(3H)-dione (Ib) and allyl chloride,
(34) 7-dimethylamino-2H-dibenzo[b,f] - s - triazino[1,2-d][1,4]thiazepine - 2,4(3H) - dione (Ib) and methyl iodide,
(35) 9,12-dimethoxy-2H-dibenzo[b,f] - s - triazino[1,2-d][1,4]thiazepine-2,4(3H)-dione (Ib) and 2-methoxyethyl bromide,

(36) 8,11-diethyl-2H-dibenzo[b,f]-s-triazino[1,2-d][1,4]thiazepine-2,4(3H)-dione (Ib) and 2-crotyl bromide,
(37) 13-chloro-2H-dibenzo[b,f]-s-triazino[1,2-d]-[1,4]thiazepine-2,4(3H)-dione (Ib) 3-(dimethylamino)-2-methylpropyl bromide,
(38) 6,7-dibromo-2H-dibenzo[b,f]-s-triazino[1,2-d]-[1,4]thiazepine-2,4(3H)-dione (Ib) and 2-(diethylamino)-ethyl p-toluenesulfonate (ester),
(39) 7,13-dichloro-2H-dibenzo[b,f]-s-triazino[1,2-d]-[1,4]thiazepine-2,4(3H)-dione (Ib) and 3-(dimethylamino)-propyl chloride,
(40) 12-bromo-9-chloro-2H-dibenzo[b,f]-s-triazino-[1,2-d][1,4]thiazepine-2,4(3H)-dione (Ib) and 4-(ethylpropylamino)-hexyl iodide,
(41) 11-chloro-8-fluoro-2H-dibenzo[b,f]-s-triazino-[1,2-d][1,4]thiazepine-2,4(3H)-dione (Ib) and 4-pyrrolidinobutyl bromide,
(42) 8-ethoxy-12-fluoro-2H-dibenzo[b,f]-s-triazino-[1,2-d][1,4]thiazepine-2,4(3H)-dione (Ib) 2-(2,2-dimethylpyrrolidino)ethyl chloride,
(43) 6-ethoxy-14-methyl-2H-dibenzo[b,f]-s-triazino-[1,2-d][1,4]thiazepine-2,4(3H)-dione (Ib) and 3-propylpiperidinoethyl chloride,
(44) 9-fluoro-11-methyl-2H-dibenzo[b,f]-s-triazino-[1,2-d][1,4]thiazepine-2,4(3H)-dione (Ib) and 2-morpholinoethyl iodide,
(45) 8-propoxy-12-methoxy-2H-dibenzo[b,f]-s-triazino-[1,2-d][1,4]thiazepine-2,4(3H)-dione (Ib) and 3-(2,3-diethyl-4-methylpiperazino)propyl bromide,
(46) 2H-dibenzo[b,f]-s-triazino[1,2-d][1,4]oxazepine-2,4(3H)-dione (Ib) and methyl bromide,
(47) 2H-dibenzo[b,f]-s-triazino[1,2-d][1,4]-oxazepine-2,4(3H)-dione (Ib) and 2-(dimethylamino)-ethyl chloride,
(48) 9-chloro-2H-dibenzo[b,f]-s-triazino[1,2-d][1,4]-oxazepine-2,4(3H)-dione (Ib) and 2-ethoxyethyl bromide,
(49) 7,8-dibromo-2H-dibenzo[b,f]-s-triazino[1,2-d]-[1,4]oxazepine-2,4(3H)-dione (Ib) and 2-(1-pyrrolidyl)-ethyl bromide,
(50) 14-diethylamino-2H-dibenzo[b,f]-s-triazino-[1,2-d][1,4]oxazepine-2,4(3H)-dione (Ib) and methyl bromide,
(51) 7,12-diethoxy-2H-dibenzo[b,f]-s-triazino[1,2-d]-[1,4]oxazepine-2,4(3H)-dione (Ib) and 2-(ethylmethylamino)-propyl α-naphthylsulfonate (ester),
(52) 6,14-dimethoxy-2H-dibenzo[b,f]-s-triazino[1,2-d]-[1,4]oxazepine-2,4(3H)-dione (Ib) and 4-(methylpropylamino)-butyl chloride,
(53) 8-ethoxy-9-fluoro-2H-dibenzo[b,f]-s-triazino-[1,2-d][1,4]oxazepine-2,4(3H)-dione (Ib) and 2-methylpyrrolidinomethyl bromide,
(54) 11-ethoxy-14-propyl-2H-dibenzo[b,f]-s-triazino-[1,2-d][1,4]oxazepine-2,4(3H)-dione (Ib) and 2-(2,6-diethylpiperidino)ethyl chloride,
(55) 7-ethyl-8-propoxy-2H-dibenzo[b,f]-s-triazino-[1,2-d][1,4]oxazepine-2,4(3H)-dione (Ib) and 3-(2,6-dimethylmorpholino)propyl bromide,
(56) 8-fluoro-11-propyl-2H-dibenzo[b,f]-s-triazino-[1,2-d][1,4]oxazepine-2,4(3H)-dione (Ib) and 3-thiomorpholinopropyl bromide,
(57) 9-fluoro-12-methyl-2H-dibenzo[b,f]-s-triazino-[1,2-d][1,4]oxazepine-2,4(3H)-dione (Ib) and 2-(2-methylthiomorpholino)ethyl chloride,
(58) 6-methoxy-14-methyl-2H-dibenzo[b,f]-s-triazino-[1,2-d][1,4]oxazepine-2,4(3H)-dione (Ib) and 4-methylpiperazinoethyl bromide,
(59) 7-methoxy-12-methyl-2H-dibenzo[b,f]-s-triazino-[1,2-s][1,4]oxazepine-2,4(3H)-dione (Ib) and 2-(2-ethylpiperazino)ethyl chloride,
(60) 2H-dibenzo[b,f]-s-triazino[1,2-d][1,4]oxazepine-2,4(3H)-dione (Ib) and 3-(2,4-dipropylpiperazino)-propyl bromide, etc.

yields, respectively, (1) 3-ethyldibenzo[c,f]-s-triazino[1,2-a]azepine-2,4-(3H,10H)-dione (Ic),
(2) 3-allyl-8-chlorodibenzo[c,f]-s-triazino[1,2-a]azepine-2,4(3H,10H)-dione (Ic),
(3) 3-(2-ethoxyethyl)-12-ethyldibenzo[c,f]-s-triazino-[1,2-a]azepine-2,4(3H,10H)-dione, (Ic),
(4) 3-[2-methoxyethyl-7-fluorodibenzo[c,f]-s-triazino-[1,2-a]azepine-2,4(3H,10H)-dione (Ic),
(5) 3-[3-(dimethylamino)-propyl]-dibenzo[c,f]-s-triazino[1,2-a]azepine-2,4(3H,10H)-dione (Ic),
(6) 3-[3-ethoxypentyl]-12-propyldibenzo[c,f]-s-triazino-[1,2-a]azepine-2,4(3H,10H)-dione (Ic),
(7) 3-[2-(diethylamino-ethyl]-8,9-dibromodibenzo-[c,f]-s-triazino[1,2-a]azepine-2,4-(3H,10H)-dione (Ic),
(8) 3-[3-(methylpropylamino)-propyl]-7-chloro-9-methyldibenzo[c,f]-s-triazino[1,2-a]azepine-2,4(3H,10H)-dione (Ic),
(9) 3-[6-(ethylmethylamino)-hexyl]-8-fluoro-12-propyldibenzo[c,f]-s-triazino[1,2-a]azepine-2,4(3H,10H)-dione (Ic),
(10) 3-pyrrolidinoethyl-9-ethoxy-13-methoxydibenzo-[c,f]-s-triazino[1,2-a]azepine-2,4(3H,10H)-dione (Ic),
(11) 3-[3-(2,6-dimethylpiperidino)-propyl]-8,13-diethoxydibenzo[c,f]-s-triazino[1,2-a]azepine-2,4(3H,10H)-dione (Ic),
(12) 3-(3-ethylmorpholinoethyl)-7,12-difluorodibenzo-[c,f]-s-triazino[1,2-a]azepine-2,4(3H,10H)-dione (Ic),
(13) 3-[2-(thiomorpholino)ethyl]-6,14-dimethyldibenzo-[c,f]-s-triazino[1,2-a]azepine-2,4(3H,10H)-dione (Ic),
(14) 3-(4-methylpiperazinoethyl)-9-bromo-13-ethyl-dibenzo[c,f]-s-triazino[1,2-a]azepine-2,4(3H,10H)-dione (Ic),
(15) 3-[2-(2,4-diethylpiperazino)ethyl]-8-chloro-12-methyldibenzo[c,f]-triazino[1,2-a]azepine-2,4-(3H,10H)-dione (Ic),
(16) 3-methyl-dibenzo[b,f]-s-triazino[1,2-d][1,4]-diazepine-2,4(3H,10H)-dione (Ic),
(17) 3-(3-methoxypropyl)-10-[2-(dimethylamino)-ethyl]-9-bromodibenzo[b,f]-s-triazino[1,2-d]-[1,4]diazepine-2,4(3H,10H)-dione (Ic),
(18) 3-(isobutyl)-10-[3-dimethylamino)-propyl]-6-chlorodibenzo[b,f]-s-triazino[1,2-d][1,4]diazepine-2,4(3H,10H)-dione (Ic),
(19) 3-[(1-pyrrolidyl)-ethyl]-10-methyldibenzo[b,f]-s-triazino[1,2-d][1,4]diazepine-2,4(3H,10H)-dione (Ic),
(20) 3-allyl-8-(dimethylamino)-10-[2-(1-pyrrolidyl)-ethyl]dibenzo[b,f]-s-triazino[1,2-d][1,4]diazepine-2,4(3H,10H)-dione (Ic),
(21) 10-allyl-3-[2-(diethylamino)-propyl]-9-fluorodibenzo[b,f]-s-triazino[1,2-d][1,4]diazepine-2,4-(3H,10H)-dione (Ic),
(22) 3-[2 - (ethylmethylamino)-ethyl]-11-ethyldibenzo[b,f]-s-triazino[1,2 - d][1,4]diazepine-2,4(3H,10H)-dione (Ic),
(23) 3-[4-(dimethylamino)-butyl]-10-(2-methoxyethyl)-8 - chlorodibenzo[b,f]-s-triazino[1,2-d][1,4]diazepine-2,4(3H,10H)-dione (Ic),
(24) 3-[5-(ethylmethylamino)-pentyl]-11-chloro-9-fluoro-dibenzo[b,f]-s-triazino[1,2-d][1,4]diazepine - 2,4(3H,10H)-dione (Ic),
(25) 3-[3-(3-ethylpyrrolidino)propyl]-10-ethyl-12-fluorodibenzo[b,f]-s-triazino[1,2-d][1,4]diazepine - 2,4(3H,10H)-dione (Ic),
(26) 10 - crotyl-3-[2-(2,4-dimethylpyrrolidino)ethyl]-6-ethoxy-14-methoxydibenzo[b,f]-s-triazino[1,2 - d][1,4]diazepine-2,4-(3H,10H)-dione (Ic),
(27) 3 - (3-ethylpiperidinoethyl)-7-ethyl-14-fluorodi-10-methylbenzo[b,f]-s-triazino[1,2-d][1,4]diazepine - 2,4 (3H,10H)-dione (Ic),

(28) 10 - [2 - (dimethylamino)ethyl]-3-(2-morpholinoethyl) - 7,8 - diethoxydibenzo[b,f] - s - triazino[1,2-d][1,4]diazepine-2,4(3H,10H)-dione (Ic),

(29) 3-[2-(3-ethylthiomorpholino)ethyl]-8,10,11-trimethyldibenzo[b,f]-s-triazino[1,2-d][1,4]diazepine - 2,4(3H, 10H)-dione (Ic),

(30) 3-(4-methylpiperazinoethyl)-10-ethyl-13-propoxy-dibenzo[b,f] - s - triazino[1,2-d][1,4]diazepine-2,4(3H, 10H)-dione (Ic),

(31) 3-[2-(dimethylamino)ethyl]-2H-dibenzo[b,f]-s-triazino[1,2-d][1,4]thiazepine-2,4(3H)-dione (Ic),

(32) 3 - (2-ethoxypropyl)-8-bromo-2H-dibenzo[b,f]-s-triazino[1,2-d][1,4]thiazepine-2,4(3H)-dione (Ic),

(33) 3-allyl-9-chloro-2H-dibenzo[b,f]-s-triazino[1,2-d][1,4]thiazepine-2,4(3H)-dione (Ic),

(34) 7 - dimethylamino-3-methyl-2H-dibenzo[b,f]-s-triazino[1,2-d][1,4]thiazepine-2,4(3H)-dione (Ic),

(35) 3 - (2-methoxyethyl)-9,12-dimethoxy-2H-dibenzo[b,f]-s-triazino[1,2-d][1,4]thiazepine-2,4(3H)-dione (Ic),

(36) 3-crotyl-8,11-diethyl-2H-dibenzo[b,f]-s-triazino[1,2-d][1,4]thiazepine-2,4(3H)-dione (Ic),

(37) 13 - chloro-3-[3-(dimethylamino)-2-methylpropyl]-2H-dibenzo[b,f]-s-triazino[1,2-d][1,4]thiazepine - 2,4(3H)-dione (Ic),

(38) 3-[2-(diethylamino)-ethyl]-6,7-dibromo-2H-dibenzo[b,f] - s - triazino[1,2-d][1,4]thiazepine-2,4(3H,10H)-dione (Ic),

(39) 3-[3-(dimethylamino)-propyl]7,13-dichloro-2H-dibenzo[b,f]-s-triazino[1,2-d][1,4]thiazepine - 2,4(3H)-dione (Ic),

(40) 3-[4-(ethylpropylamino)-hexyl]-12-bromo-9-chloro-2H - dibenzo[b,f]-s-triazino[1,2-d][1,4]thiazepine-2,4(3H)-dione (Ia),

(41) 3-(4-pyrrolidinobutyl)-11-chloro-8-fluoro-2H-dibenzo[b,f] - s - triazino[1,2-d][1,4]thiazepine-2,4(3H)-dione (Ic),

(42) 3-[2-(2,2-dimethylpyrrolidino)ethyl] - 8 - ethoxy-12-fluoro - 2H - dibenzo[b,f]-s-triazino[1,2-d][1,4]thiazepine-2,4(3H)-dione (Ic),

(43) 3-(3-propylpiperidinoethyl)-6-ethoxy-14-methyl-2H-dibenzo[b,f] - s - triazino[1,2 - d][1,4]thiazepine-2,4(3H)-dione (Ic),

(44) 3 - (2-morpholinoethyl)-9-fluoro-11-methyldibenzo-2H-[b,f] - s - triazino[1,2-d][1,4]thiazepine-2,4(3H)-dione (Ic),

(45) 3-[3-(2,3-diethyl-4-methylpiperazino)-propyl]-8-propoxy - 12 - methoxy-2H-dibenzo[b,f]-s-triazino[1,2-d][1,4]thiazepine,2,4-(3H)-dione (Ic),

(46) 3-methyl-2H-dibenzo[b,f]-s-triazino[1,2-d][1,4]oxazepine-2,4(3H)-dione (Ic),

(47) 3 - [2-(dimethylamino)ethyl]-2H-dibenzo[b,f]-s-triazino[1,2-d][1,4]oxazepine-2,4(3H)-dione (Ic),

(48) 3-ethoxymethyl-2H-9-chlorodibenzo[1,2-d][1,4]oxazepine-2,4(3H)-dione (Ic),

(49) 3 - [2-(1-pyrrolidyl)-ethyl]-7,8-dibromo-2H-dibenzo[b,f] - s - triazino[1,2-d][1,4]oxazepine-2,4(3H)-dione (Ic),

(50) 14-diethylamino - 3 - methyl-2H-dibenzo[b,f]-s-triazino[1,2-d][1,4]oxazepine-2,4(3H)-dione (Ic),

(51) 3-[2-(ethylmethylamino)-propyl]-7,12-diethoxy-2H-dibenzo[b,f]-s-triazino[1,2 - d][1,4]oxazepine-2,4(3H)-dione (Ic),

(52) 3 - [4-(methylpropylamino)-butyl]-6,14-dimethoxy-2H-dibenzo[b,f] - s - triazino[1,2-d][1,4]oxazepine-2,4(3H)-dione (Ic),

(53) 3 - (2-methylpyrrolidinomethyl)-8-ethoxy-9-fluoro-2H-dibenzo[1,2-d][1,4]oxazepine-2,4(3H)-dione (Ic),

(54) 3-[2-(2,6-diethylpiperidino)ethyl] - 11 - ethoxy-14-propyl - 2H - dibenzo[1,2-d][1,4]oxazepine-2,4(3H)-dione (Ic),

(55) 3 - [3-(2,6-dimethylmorpholino)propyl]-7-ethyl-8-propoxy - 2H - dibenzo[b,f]-s-triazino[1,2-d][1,4]oxazepine-2,4(3H)-dione (Ic),

(56) 3-(3-thiomorpholinopropyl)-8-fluoro-11-propyl-2H-dibenzo[b,f]-s-triazino[1,2-d][1,4]oxazepine - 2,4(3H)-dione (Ic),

(57) 3-[2-(2 - methylthiomorpholino)ethyl]-9-fluoro-12-methyl - 2H - dibenzo[b,f]-s-triazino[1,2-d][1,4]oxazepine-2,4(3H)-dione (Ic),

(58) 3 - (4-methylpiperazinoethyl)-6-methoxy-14-methyl-2H - dibenzo[b,f]-s-triazino[1,2-d][1,4]oxazepine-2,4-(3H)-dione (Ic),

(59) 3-[2-(2-ethylpiperazino)ethyl]-7-methoxy-12-methyl - 2H - dibenzo[b,f]-s-triazino[1,2-d][1,4]oxazepine-2,4(3H)-dione (Ic),

(60) 3-[3 - (2,4-dipropylpiperazino)propyl]-2H-dibenzo[b,f]-s-triazino[1,2 - d][1,4]oxazepine - 2,4(3H)-dione (Ic), etc.

What is claimed is:
1. A compound of the formula

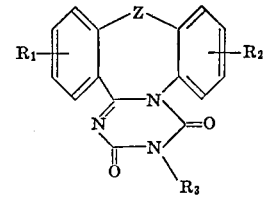

wherein $R_1$ and $R_2$ are selected from the group consisting of hydrogen, bromine, chlorine, fluorine, lower alkyl of 1 through 3 carbon atoms, lower alkoxy of 1 through 3 carbon atoms, lower alkylthio of 1 through 3 carbon atoms, lower alkylsulfonyl of 1 through 3 carbon atoms, lower dialkylamino having lower alkyl moieties of 1 through 3 carbon atoms, lower alkanoylamido having lower alkanoyl moieties of 1 through 3 carbon atoms, trifluoromethyl, cyano and nitro; $R_3$ is selected from the group consisting of hydrogen, lower alkyl of 1 through 3 carbon atoms, lower alkenyl of 3 through 4 carbon atoms, —$C_n$—$H_{2n}$—O— lower alkyl wherein $n$ is 2 through 6 and lower alkyl is of 1 through 3 carbon atoms, carboalkoxy having a lower alkyl moiety of 1 through 3 carbon atoms and

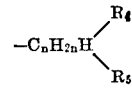

wherein $n$ has the same meaning as above and $R_4$ and $R_5$ have the same meaning as $R_3$, above, except carboalkoxy, and $R_4$ and $R_5$ when taken together with —N< is a saturated heterocyclic amino radical selected from the group consisting of pyrrolidino, piperidino, hexamethylenimino, morpholino, thiomorpholino, piperazino, 4-lower alkylpiperazino wherein lower alkyl is of 1 through 3 carbon atoms and their counterparts having lower alkyl substituent(s) of 1 through 3 carbon atoms; Z is selected from the group consisting of O, S,

and >N—$R_9$ wherein $R_7$, $R_8$ and $R_9$ have the same meaning as $R_3$, above, except carboalkoxy, and $R_7$ in addition includes

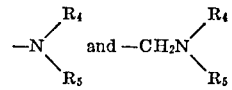

wherein $R_4$ and $R_5$ have the same meaning as above; and a pharmacologically acceptable acid addition salt thereof.

2. A compound of claim 1 wherein $R_1$ and $R_2$ are hydrogen. $R_3$ is

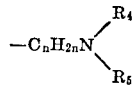

wherein $n$ is 2, $R_4$ and $R_5$ are methyl and Z is

wherein $R_7$ and $R_8$ are hydrogen, namely, 3-[2-(dimethylamino)ethyl]-dibenzo[c,f] - s - triazino[1,2-a]azepine-2,4 (3H,10H)-dione.

3. A compound of claim 1 wherein $R_1$, $R_2$ and $R_3$ are hydrogen and Z is

wherein $R_7$ and $R_8$ are hydrogen, namely dibenzo[c,f]-s-triazino[1,2-a]azepine-2,4(3H,10H)-dione.

4. A compound of claim 1 wherein $R_1$ and $R_2$ are hydrogen, $R_3$ is carboethoxy and Z is

wherein $R_7$ and $R_8$ are hydrogen, namely, 2,10-dihydro-2,4 - dioxodibenzo[c,f]-s-triazino[1,2 - a]azepine-3(4H)-carboxylic acid, ethyl ester.

5. A compound of claim 1 wherein $R_1$ and $R_2$ are hydrogen, $R_3$ is carbethoxy and Z is

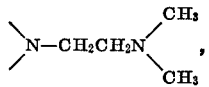

namely, 10 - [2-(dimethylamino)-ethyl]-2,10-dihydro-2,4-dioxodibenzo[b,f] - s - triazino[1,2 - d][1,4]diazepine-3 (4H)-carboxylic acid, ethyl ester.

6. A compound of claim 1 wherein $R_1$, $R_2$ and $R_3$ are hydrogen and Z is

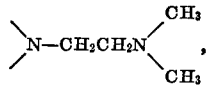

namely, 10 - [2-(dimethylamino)-ethyl]-dibenzo[b,f]-s-triazino[1,2-d][1,4]diazepine-2,4(3H,10H)-dione.

References Cited
UNITED STATES PATENTS
3,719,676    3/1973    Crank _____ 260—248

JOHN M. FORD, Primary Examiner

U.S. Cl. X.R.

260—247.1, 243 B, 247.2 A, 333, 327 B, 239 DD, 239 D; 424—249